(12) United States Patent
Takano et al.

(10) Patent No.: US 7,721,871 B2
(45) Date of Patent: May 25, 2010

(54) TRAVELLING CARRIER DELIVERY EQUIPMENT

(75) Inventors: Ryosuke Takano, Osaka (JP); Shigeyoshi Nishihara, Shiga (JP)

(73) Assignee: Daifuku Co., Ltd, Osaka (JP)

( * ) Notice: Subject to any disclaimer, the term of this patent is extended or adjusted under 35 U.S.C. 154(b) by 488 days.

(21) Appl. No.: 11/829,283

(22) Filed: Jul. 27, 2007

(65) Prior Publication Data
US 2007/0289845 A1 Dec. 20, 2007

Related U.S. Application Data

(63) Continuation of application No. PCT/JP2006/311991, filed on Jun. 15, 2006.

(30) Foreign Application Priority Data

Jun. 22, 2005 (JP) .............................. 2005-181644
Jun. 22, 2005 (JP) .............................. 2005-181645

(51) Int. Cl.
*B65G 43/08* (2006.01)
(52) U.S. Cl. ............... 198/346.2; 198/465.4; 198/678.1
(58) Field of Classification Search ............. 198/343.2, 198/346.2, 465.4, 681, 678.1, 817; 104/89, 104/91
See application file for complete search history.

(56) References Cited

U.S. PATENT DOCUMENTS 4,723,714 A * 2/1988 Lucas ........................... 104/91
5,036,772 A * 8/1991 Langenbacher et al. ....... 104/91
7,127,997 B2 * 10/2006 Nishihara et al. ............. 104/89
7,134,542 B1 * 11/2006 Noestheden ................. 198/681
7,484,616 B2 * 2/2009 Nakamura ................ 198/465.4
7,497,321 B2 * 3/2009 Matsubara et al. ....... 198/465.4
7,556,139 B2 * 7/2009 Tsuruya et al. .......... 198/465.4

FOREIGN PATENT DOCUMENTS

JP 2001-97546 4/2001

* cited by examiner

*Primary Examiner*—James R Bidwell
(74) *Attorney, Agent, or Firm*—St. Onge Steward Johnston & Reens LLC

(57) ABSTRACT

Travelling carrier delivery equipment includes a delivery unit for transferring a travelling carrier that has no self-running means between a movable rail and a main rail by means of external friction-driven, and the travelling carrier is provided with a friction driving surface across its entire length, the delivery unit has a friction drive wheel and friction drive wheel moving means, the friction drive wheel is provided on the movable rail and is switchable between a driving state, in that it propels the travelling carrier via the friction driving surface and a driving release state, and the friction drive wheel moving means reciprocates the friction drive wheel between a retreating position (R), at which the friction drive wheel can be made to contact with the friction driving surface of the travelling carrier supported on the movable rail and a forwarding position (F), at which the friction drive wheel can be made to contact with the friction driving surface of the travelling carrier supported on the main rail.

18 Claims, 15 Drawing Sheets

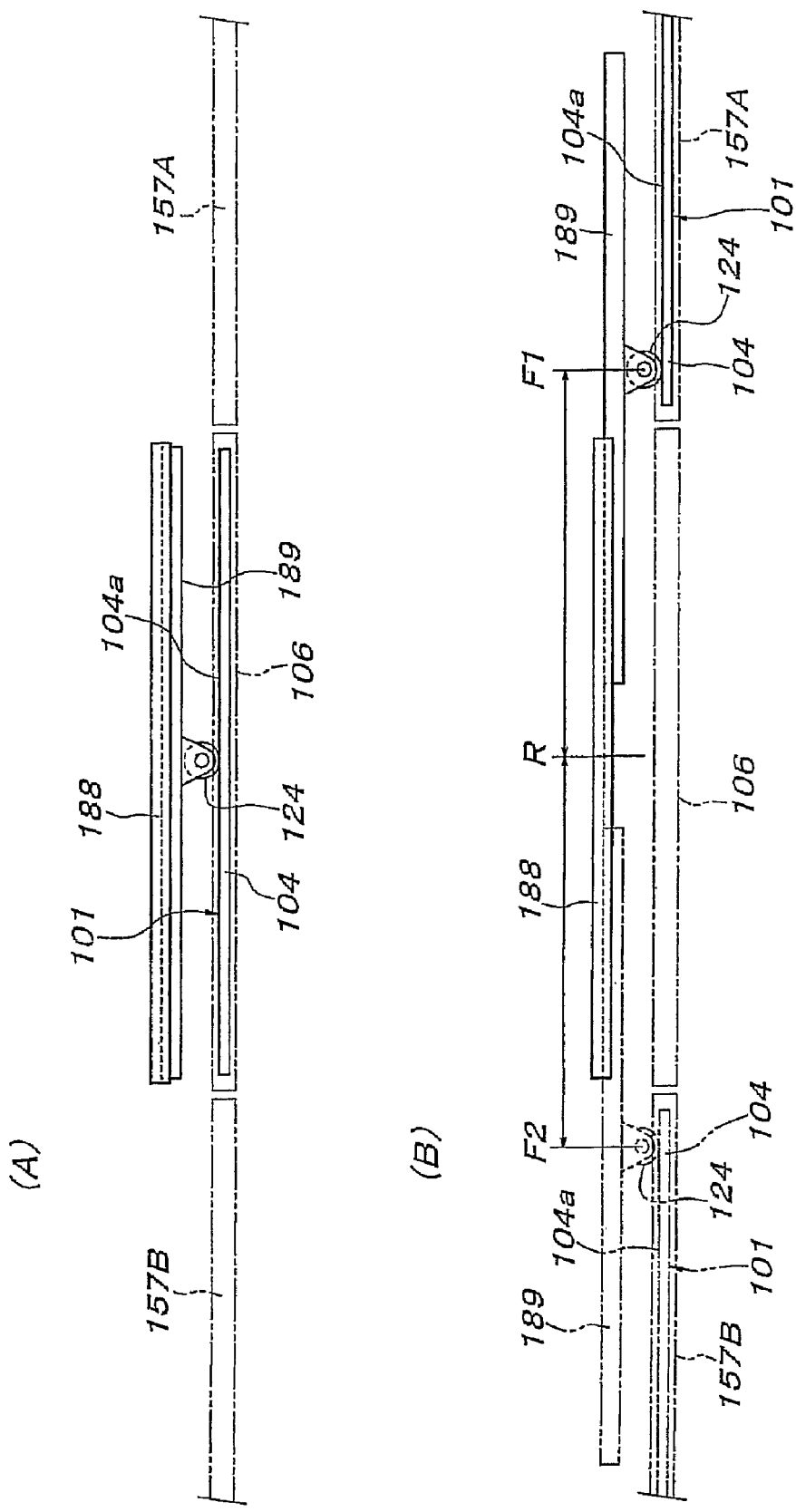

US 7,721,871 B2

TRAVELLING CARRIER DELIVERY EQUIPMENT

RELATED APPLICATIONS

This is a continuation of PCT Application No. PCT/JP2006/311991, filed Jun. 15, 2006, pending.

FIELD OF THE INVENTION

The present invention relates to delivery equipment including delivery units for transferring a travelling carrier that has no self-running means between a main rail and a movable rail connectable to the main rail by means of external friction-driven.

BACKGROUND OF THE INVENTION

This type of travelling carrier delivery equipment is utilized as means for switching a travelling path of a travelling carrier, means for distributing travelling carriers to a plurality of storage branch lines from a main line as a main travelling path of the travelling carrier and returning the travelling carriers to the main line from storage branch lines, or means for reversing the front and rear direction of a travelling carrier in the middle of a travelling path of the travelling carrier. For example, the travelling carrier delivery equipment described in Japanese Unexamined Patent Publication No. 2001-97546 uses a traverse-type movable rail that transfers a travelling carrier onto a second travelling path for travelling the travelling carrier in reverse from a first travelling path for travelling a carriage-like travelling carrier for carrying an automobile body in a forward direction, and as a delivery unit for transferring the travelling carrier onto the movable rail from the first travelling path, a friction drive wheel disposed at a terminal end of the first travelling path and a friction drive wheel on the movable rail are used, and as drive means for transferring the travelling carrier onto the second travelling path from the movable rail, a friction drive wheel disposed at the beginning of the second travelling path and the friction drive wheel on the movable rail are used.

As described above, in such a conventional type of travelling carrier delivery equipment, a friction drive wheel is necessary not only on the movable rail side but also on each travelling path side to which this movable rail is connected, and in addition, control of the friction drive wheel on each travelling path side is also necessary, so that the control system becomes complicated, and as a whole, the facilities cost becomes very high. Particularly, in travelling carrier delivery equipment for storage in which a number of storage rails for storing a number of travelling carriers are arranged parallel, and the movable rail traverses and is connectable to an arbitrary storage rail, the friction drive wheel must be provided for each of all storage rails, and this is not practicable in terms of the facilities cost. Of course, travelling carrier delivery equipment constituted so as to transfer a travelling carrier by pushing and pulling drive means on the movable rail side is also considered, however, in the case of equipment that handles travelling carriers with long entire lengths for carrying long objects, the stroke of a lock tool on the pushing and pulling drive means side that engages with a locked portion of the travelling carrier side also becomes longer according to the entire length of the travelling carrier, the pushing and pulling drive means becomes large in size and complicated, and this is still impractical.

SUMMARY OF THE INVENTION

An object of the invention is to provide travelling carrier delivery equipment that can solve the above-described conventional problem, and to show the means for this by attaching parenthesized reference numerals described later in the embodiments thereto, the travelling carrier delivery equipment includes a main rail (11a, 118a), a movable rail (6, 106) which can be connected to the main rail (11a, 118a) by moving, and a delivery unit (16A, 121A) for transferring a travelling carrier (1, 101) between the movable rail (6, 106) and the main rail (11a, 118a) by means of external friction-driven, wherein a friction driving surface (4a, 104a) parallel to the moving direction of the travelling carrier (1, 101) is provided across the entire length of the travelling carrier, the delivery unit (16A, 121A) has a friction drive wheel (17, 124) and friction drive wheel moving means (18, 126), and the friction drive wheel (17, 124) is provided on the movable rail (6, 106) and is switchable between a driving state in that the friction drive wheel propels the travelling carrier (1, 101) via the friction driving surface (4a, 104a) and a driving release state, and the friction drive wheel moving means (18, 126) reciprocates the friction drive wheel (17, 124) between a retreating position (R) at which the friction drive wheel can be made to contact with the friction driving surface (4a, 104a) of the travelling carrier (1, 101) supported on the movable rail (6, 106) and a forwarding position (F) at which the friction drive wheel can be made to contact with the friction driving surface (4a, 104a) of the travelling carrier (1, 101) supported on the main rail (11a, 118a).

To carry out the invention constituted as described above, the driving release state of the friction drive wheel (17) is realized not by forcibly separating this friction drive wheel (17) from the friction driving surface (4a) of the travelling carrier (1) but by switching into a freely-rotatable state.

The delivery unit (121A) has friction drive wheel position switching means (125) that switches the position of the friction drive wheel (124) between a driving position at which the friction drive wheel is made to pressure contact with the friction driving surface (104a) and a driving release position at which the friction drive wheel is separated from the friction driving surface (104a), and the driving release state of the friction drive wheel (124) is realized by switching the position of the friction drive wheel (124) to the driving release position.

The friction drive wheel moving means (126) can compose a movable body (127) that is movable parallel to the movable rail (106) and drive means (128) for reciprocating this movable body (127), and the friction drive wheel position switching means (125) composes a friction drive wheel supporting member (140) which is supported on the movable body (127) movably in directions to approach and move away from the friction driving surface (104a) of the travelling carrier (101) and on which the friction drive wheel (124) is supported, a drive member (141) which is supported on the movable body (127) movably in directions to approach and move away from the friction driving surface (104a) of the travelling carrier (101), a joint (142) which joins this drive member (141) and the friction drive wheel supporting member (140) movably in a predetermined range in the approaching and moving away directions, a spring (143) which urges the friction drive wheel supporting member (140) in a direction to approach the friction driving surface (104a) of the travelling carrier (101) with respect to the drive member (141), and drive means (144) for reciprocating the drive member (141).

The drive means (128) of the friction drive wheel moving means (126) can be formed by, as described in claim 5, a rack gear (133) provided parallel to the moving direction on the movable body (127), a pinion gear (134) that engages with this rack gear (133), and a motor (136) that rotate-drives this pinion gear (134) forward and reverse.

In addition, it is possible that on both front and rear sides of the moving direction of the friction drive wheel (124), a pair of guide rollers (137a, 137b) that come into contact with the friction driving surface (104a) of the travelling carrier (101) are provided, and the pair of guide rollers (137a, 137b) move integrally with the friction drive wheel (124) that is moved to reciprocate by the friction drive wheel moving means (126).

In addition, it is possible that the friction drive wheel (17, 124) is supported movably in directions to approach and move away from the friction driving surface (4a, 104a) of the travelling carrier (1, 101) and urged to the friction driving surface (4a, 104a) side of the travelling carrier (1, 101) by a spring (30, 143), and provided with a backup roller (31, 153a, 153b, 156a, 156b) that sandwiches the travelling carrier (1, 101) between the same and the friction drive wheel (17, 124). This constitution described in claim 7 can be carried out by combining this with the constitution described in any one of claims 1 to 6. In addition, when the constitution described in claim 7 is employed, the backup roller (153a, 153b, 156a, 156b) can be provided on both front and rear sides of the friction drive wheel (124) in a direction in that the friction drive wheel moving means (126) reciprocates the friction drive wheel (124).

Furthermore, as the backup rollers (153a, 153b, 156a, 156b), a backup roller (153a, 153b) the position of which is fixed on the movable rail (106) side at a position corresponding to the friction drive wheel (124) at a retreating position (R) and a backup roller (156a, 156b) the position of which is fixed on the main rail (118a) side at a position corresponding to the friction drive wheel (124) at the forwarding position (F) can be provided, and as described in claim 10, it is also possible that the backup roller (31) is formed so as to be reciprocated integrally with the friction drive wheel (17) by the friction drive wheel moving means (18).

When a travelling carrier (1) has a load bar (4) that is hung down on the movable rail (6) via trolleys (5) and parallel to the moving direction, one side surface of this load bar (4) is formed into the friction driving surface (4a), it is possible that the friction drive wheel moving means (18) includes a gate-shaped frame (22) covering the movable rail (6) from above and a reciprocate driving actuator (21) that is set on the movable rail (6) and reciprocates the gate-shaped frame (22), and the friction drive wheel (17) and the backup roller (31) are attached to vertical support columns (22a, 22b) on both sides of the gate-shaped frame (22).

When the movable rail (6, 106) has a length equal to or close to an entire length of the travelling carrier (1, 101), it is possible that the retreating position (R) and the forwarding position (F) of the friction drive wheel (17, 124) are set near the connecting ends of the movable rail (6, 106) and the main rails (11a, 118a).

When the movable rail (6, 106) is formed movably in a direction orthogonal to its length direction, and the main rail (11a, 11b, 118a, 118b) is provided on both sides of the moving path of the movable rail (6, 106), as described in claim 13, the delivery unit (16A, 16B, 121A, 121B) can be provided on both ends of the movable rail (6, 106).

When the movable rail (106) has a length equal to or close to an entire length of the travelling carrier (101), and formed movably in a direction orthogonal to its length direction, and the main rail (157A, 157B) is provided on both sides of the moving path of the movable rail (106), as the retreating position (R) of the friction drive wheel (124), one point at which the friction drive wheel (124) can be made to contact with almost the central position of an entire length of the friction driving surface (104a) of the travelling carrier (101) supported by the movable rail (106) can be set, and as the forwarding position of the friction drive wheel (124), two points of a first forwarding position (F1) at which the friction drive wheel (124) can be made to contact with the friction driving surface (104a) of the travelling carrier (101) supported by one main rail (157A) to which one end of the movable rail (106) is connected, and a second forwarding position (F2) at which the friction drive wheel (124) can be made to contact with the friction driving surface (104a) of the travelling carrier (101) supported on the other main rail (157B) to which the other end of the movable rail (106) is connected, can be set.

In addition, an auxiliary rail (158) that can freely open and close and fills a space between a movable rail (106) and a main rail (157) to which the movable rail (106) is connected can be provided on the end of the movable rail (106). It is possible that the auxiliary rail (158) is pivotally supported on an end of the movable rail (106) so as to swing vertically, and drive means (160) that switches this auxiliary rail (158) between a standing open posture and a use posture in which the auxiliary rail (158) is connected to a main rail (157) is provided, and on this auxiliary rail (158) and the main rail (157), vertical fitting portions (174a, 174b, 175) that fit with each other when the auxiliary rail (158) is switched to the use posture in which it is connected to the main rail (157) and prevents leftward and rightward horizontal displacements of these rails (157, 158) are provided.

In addition, it is possible that, on a travelling carrier delivery side end of the movable rail (106), a stopper (165) that freely opens and closes and stops the movement of the travelling carrier (101) to the auxiliary rail (158) side is provided, and this stopper (165) and the auxiliary rail (158) are interlocked with each other so that when the auxiliary rail (158) is in a standing open posture, the stopper (165) takes an acting posture in which the stopper restrains the travelling carrier (101), and when the auxiliary rail (158) is in a use posture, the stopper (165) takes an non-acting posture in which it allows the travelling carrier (101) to travel to the auxiliary rail (158) side.

Furthermore, it is possible that, on a travelling carrier delivery side end of the main rail (157), a stopper (169) that freely opens and closes and stops the movement of the travelling carrier (101) to the movable rail (106) side is provided, and on the auxiliary rail (158) side, means (181) for operating the stopper (169) is provided, and when the auxiliary rail (158) is switched from the standing open posture to the use posture, the operating means (181) switches the stopper (169) from an acting posture to a non-acting posture, and when the auxiliary rail (158) is switched from the use posture to the standing open posture, the stopper (169) is switched from the non-acting posture to the acting posture.

In the travelling carrier delivery equipment relating to the invention described in claim 1, when the movable rail transfers the travelling carrier from the main rail side which the movable rail is connected to the movable rail side, the friction drive wheel is moved to the forwarding position in a driving release state, this friction drive wheel is made to contact with the friction driving surface of the travelling carrier stopping at a predetermined position on the main rail side, and in this state, the friction drive wheel is switched into a driving state and rotate-driven in a direction to draw-in the travelling carrier to propel the travelling carrier from the main rail side to the movable rail side, and simultaneously, the friction drive wheel is moved to the retreating position, whereby the entirety of the travelling carrier can be transferred to the movable rail side. On the other hand, when the movable rail transfers the travelling carrier from the movable rail side to the main rail side to which the movable rail is connected, the friction drive wheel at the retreating position is switched to a driving state and rotate-driven in the travelling carrier sending-out direction to propel the travelling carrier from the movable rail side to the main rail side, and simultaneously the friction drive wheel is moved to the forwarding position, whereby the entirety of the travelling carrier can be transferred to the main rail side.

Namely, according to the travelling carrier delivery equipment of the invention, it is only necessary that the friction drive wheel and the friction drive wheel moving means are provided on the movable rail side, and a main rail to which this movable rail is connectable by movement or rotation is a storage rail for storing the travelling carrier, and even when a large number of storage equipment is arranged by the side of the moving path of the movable rail, the cost for the means and controlling for transferring the travelling carrier between the movable rail and the respective storage rails (main rails) can be minimized and the invention can be carried out at low cost.

It is not necessary to provide an actuator that forcibly spaces the friction drive wheel from the friction driving surface of the travelling carrier, and the invention can be carried out by a simple constitution in which, to simply switch the friction drive wheel to a freely-rotatable state, for example, a brakeless motor is used, and as a reducer between this motor and the friction drive wheel, a type that enables reverse rotation transmission from the friction drive wheel side is used or a clutch is interposed in the transmission system between the motor and the friction drive wheel.

On the other hand, the friction drive wheel is switched to the driving position at which it comes into pressure-contact with the friction driving surface of the travelling carrier only when the travelling carrier is drawn-in to the movable rail side or sent-out to the main rail side in actuality, and in other cases where the friction drive wheel is moved to the forwarding position as a driving start position or the friction drive wheel after completing the sending-out driving of the travelling carrier is returned to the retreating position, the friction drive wheel is switched to a driving release position at which it is spaced from the friction driving surface of the travelling carrier, so that even without using means for locking the position of the travelling carrier until the driving starts, or even when the pressure-contact force of the friction drive wheel with the friction driving surface is increased to make possible reliable and strong driving, the travelling carrier does not move to an undesirable side by following the movement of the friction drive wheel, and the travelling carrier can be reliably made to perform the predetermined action. By employing the constitution described herein, the delivery equipment of the invention can be easily carried out at low cost.

In addition, the posture of the travelling carrier that is friction-driven by the friction drive wheel can be maintained in a posture parallel to the travelling direction, and the transfer driving of the travelling carrier by the friction drive wheel between the movable rail and a main rail to which the movable rail is connected can be excellently and reliably performed.

While a frictional force that is strong as necessary is generated between the friction driving surface of the travelling carrier and the friction drive wheel, this travelling carrier can be prevented from tilting due to pressure contact with the friction drive wheel, so that even in the case of a type of travelling carrier that is hung down on the guide rail via trolleys, the travelling carrier can be reliably driven and propelled. In this case, the action of the backup roller can be made more reliable. The backup roller is pivotally supported on predetermined positions of the movable rail and the main rail, so that the constitution using this backup roller can be simply and easily carried out. On the other hand, the travelling carrier propelling action by the friction drive wheel can be reliably performed in all cases where the friction drive wheel is at the retreating position, at the forwarding position, or being moved between these positions. Therefore, when the travelling carrier has a load bar that is hung down on the movable rail via trolleys and is parallel to the moving direction, and one side surface of this load bar can be formed into the friction driving surface, the entire equipment including the friction drive wheel, the backup roller, and the friction drive wheel moving means can be well configured.

In addition, even in equipment that handles a travelling carrier that is long in entire length and carries a long object, the reciprocation stroke of the friction drive wheel can be short, and the friction drive wheel moving means can be constituted small in size at low cost. When the invention is applied to storage equipment including, for example, a large number of storage rails can be arranged on both sides of the moving path of the movable rail, however, the transfer of the travelling carrier between the movable rail and each of the main rails to which both ends of the movable rail are connected can be performed by one friction drive wheel.

Furthermore, to prevent contact between the movable rail and a main rail even if movement of the movable rail involves slight shaking, the space between the moving path of the movable rail and the main rail can be made sufficiently large, and transferring of the travelling carrier between the movable rail and the main rail to which the movable rail is connected can be reliably performed. In this case, according to the constitution described in claim 16, positional displacement in the left and right horizontal direction between the movable rail and the main rail to which the movable rail is connected can be prevented by using the posture switching of the auxiliary rail, whereby the transferring of the travelling carrier between the rails can be more safely and more reliably performed.

In addition, in an accident with the travelling carrier supported on the movable rail freely moving during movement of the movable rail and coming off the movable rail, or in a situation in that the movable rail is not connected to the main rail, an accident with the travelling carrier supported on this main rail freely moving and coming off the main rail can be prevented by the stopper, and the opening and closing operations of this stopper can be automatically performed by using posture switching of the auxiliary rail without artificial operations.

BRIEF DESCRIPTION OF THE DRAWINGS

For a complete understanding of the above and other features of the invention, reference shall be made to the following detailed description of the preferred embodiments of the invention and to the accompanying drawings; wherein:

FIG. 16 is switched to a use posture.

FIG. 21 are schematic plan views describing a fourth embodiment of the invention, and FIG. 21A shows a state in that the friction drive wheel is at a retreating position, and FIG. 21B shows a state in that the friction drive wheel is at a forwarding position.

Figure 1:
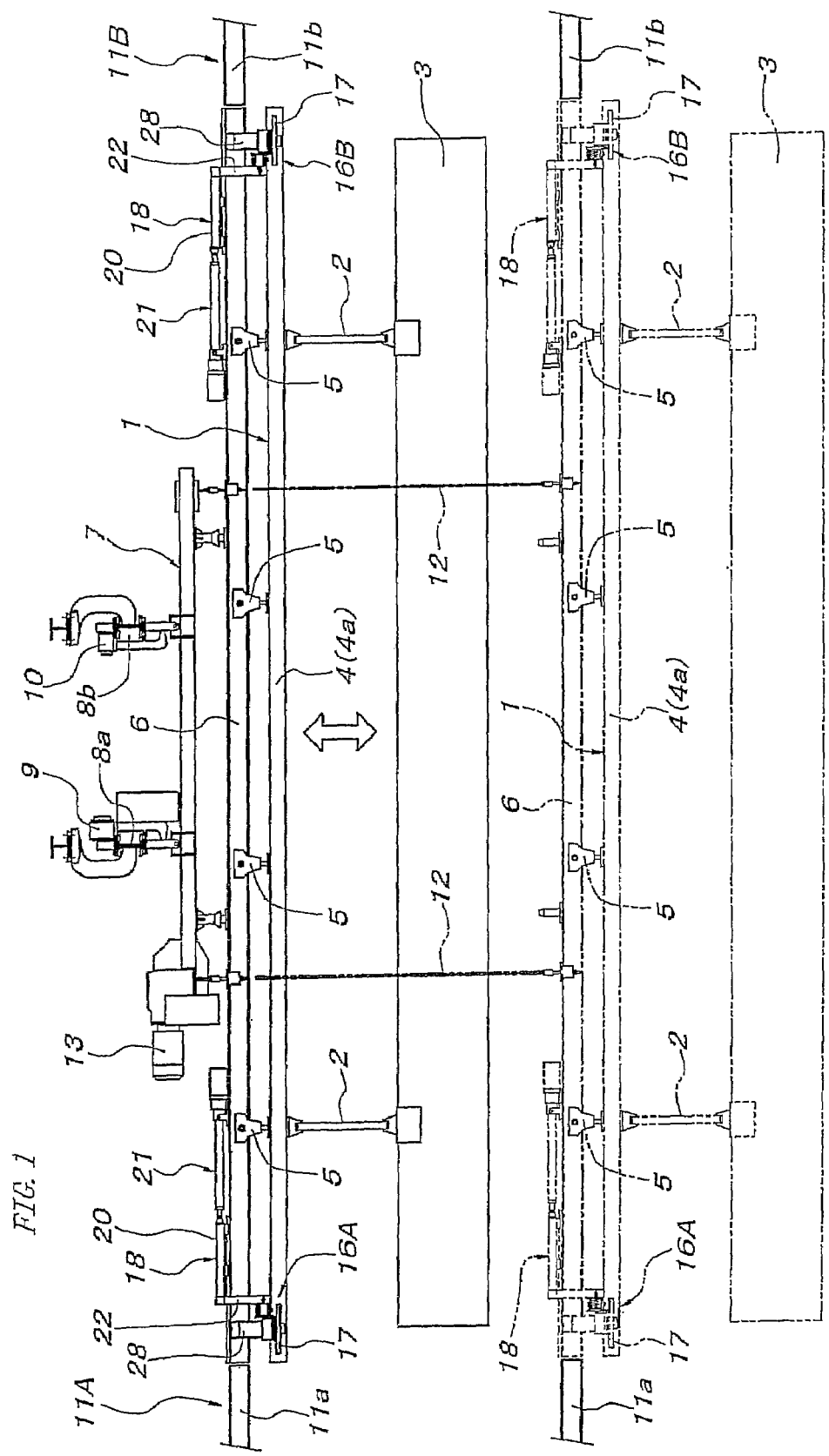
FIG. 1 is a side view of a first embodiment of the invention.

DESCRIPTION OF SYMBOLS 1, 101: travelling carrier
2, 102: hanger
3, 103: long carried object
4, 104: load bar
4a, 4b, 104a: friction driving surface
5, 105: trolley
6, 106: movable rail
7, 107: movable rail hanging travelling body
8a, 8b: guide rail
9: power trolley
10: free trolley
11A, 11B, 118A, 118B: storage area
11a, 11b, 118a, 118b: storage rail
12: hanging wire
13: elevating drive means
14, 119: delivering-in main rail
15, 120: delivering-out main rail
16A, 16B, 121A, 121B: delivery unit
17, 124: friction drive wheel
18, 126: friction drive wheel moving means
19: slide guide rail
20: rod-like in-and-out movable body
21: actuator
22: gate-shaped frame
24: electric screw cylinder
26: vertical support shaft
28, 136, 145, 149, 161: reducer-equipped motor
30, 143: spring
31: backup roller
33, 34, 157, 157A, 157B: main rail
36: guide roller unit
110: travelling drive means for movable rail hanging mobile body
122A to 123B: backup means
125: friction drive wheel position switching means
127: movable body
128: movable body drive means
129a to 129c: groove-shaped rail
131: fixed substrate
132a to 132c: roller
133: rack gear
134: pinion gear
137a, 137b, 178a, 178b: guide roller
140: friction drive wheel supporting member
141: drive member
142: joint
144: drive member drive means
148a, 148b: slide guide rail
150: drive lever
151: vertical axis roller
152: cam hole
153a, 153b, 156a, 1156b: vertical axis roller
158: auxiliary rail
159: horizontal support shaft
160: auxiliary rail drive means
164: movable rail side stopper means
165: stopper
166: main rail side stopper means
169: L-shaped stopper
172: passive member
173: movable rail positioning means
174a, 174b: guide plate
75: fitting member
179: receiving plate
180: L-shaped relay lever
184: power transmission roller
185: passive roller
186: operating member
188: fixed guide rail
189: movable guide rail
R: retreating position of friction drive wheel
F, F1, F2 forwarding positions of friction drive wheel

DETAILED DESCRIPTION OF THE INVENTION

Figure 2:
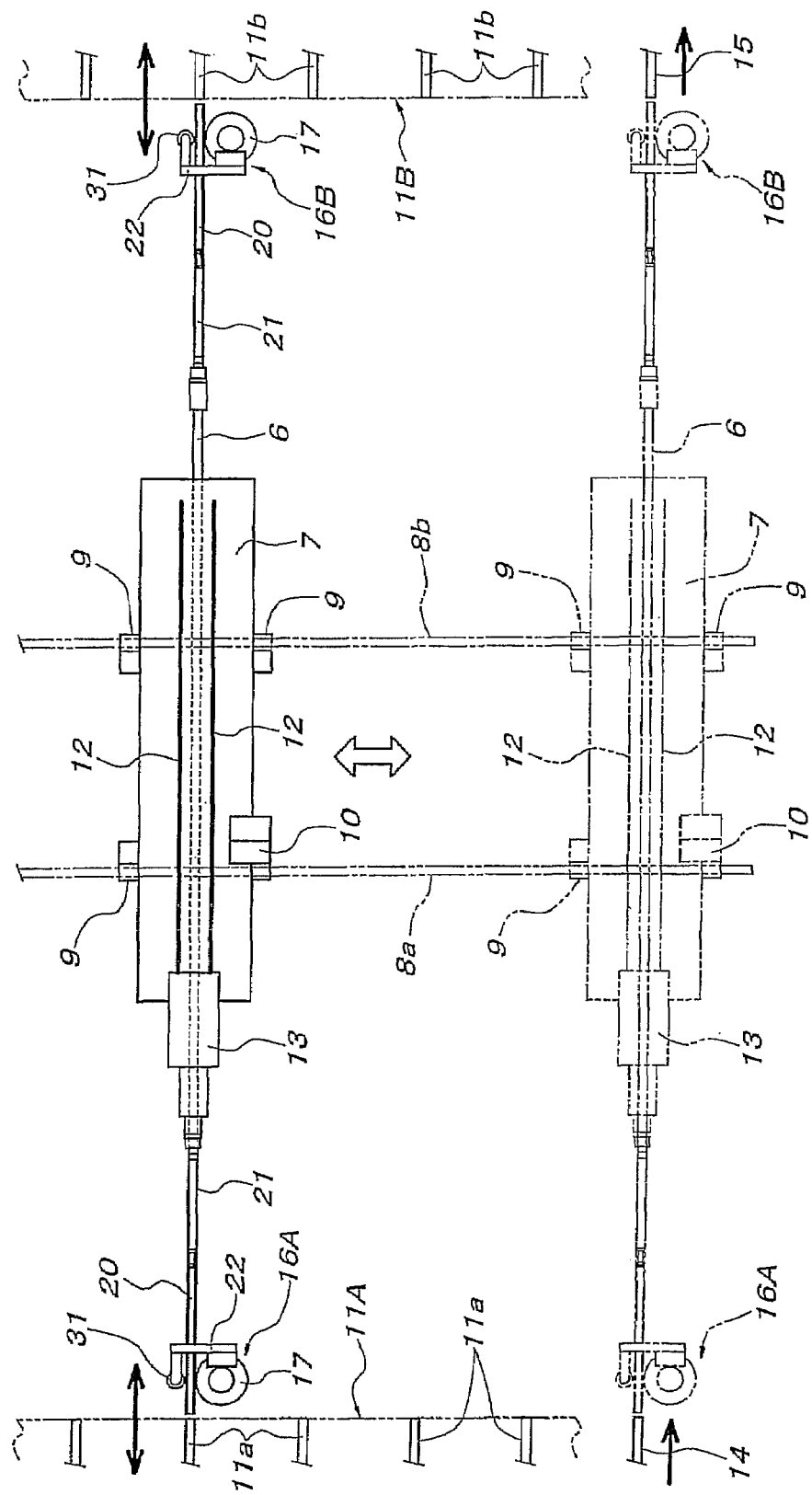
FIG. 2 is a schematic plan view of the same first embodiment.

Hereinafter, a first embodiment of the invention will be described based on FIG. 1 through FIG. 5. In FIG. 1 and FIG. 2, the reference numeral 1 denotes a travelling carrier having a load bar 4 for hanging a long carried object 3 via hangers 2, and trolleys 5 attached to both ends and a plurality of intermediate points of the load bar 4. In the figures, the trolleys 5 on both ends are not shown and the load bar 4 is simply shown as one bar-like member, however, in actuality, as conventionally known, the load bar is divided so as to be bent at least horizontally around a vertical axis at a plurality of points (for example, at positions of the trolleys 5) in the length direction.

The reference numeral 6 denotes a movable rail which has an entire length almost equal to the entire length of the travelling carrier 1 (load bar 4) and on which one travelling carrier 1 can be hung down movably via the trolleys 5. The reference numeral 7 denotes a movable rail hanging mobile body (hereinafter, abbreviated to mobile body) on which the movable rail 6 is hung down and which is hung down on guide rails 8*a* and 8*b* on two rows movably transversely in the horizontal direction orthogonal to the length direction of the movable rail 6 via one power trolley 9 having self-running drive means (motor-driven drive wheel) and a plurality of free trolleys 10, and self-runs in both forwarding and retreating directions by means of the self-running drive means of the power trolley 9 and automatically stops at a predetermined position. The reference numerals 11A and 11B are storage areas disposed at both sides of the transverse movement path of the mobile body 7 (movable rail 6), and in both storage areas 11A and 11B, storage rails 11*a* and 11*b* are arranged at appropriate intervals in the transverse movement direction of the mobile body 7 (movable rail 6) so that they are connected to both ends of the movable rail 6 of the mobile body 7 stopped at the predetermined position.

The movable rail 6 in this embodiment is hung down so as to elevate by means of a plurality of hanging wires (wire ropes or chains) that can be wound around and unwound from the movable body 7, and by winding or unwinding the hanging wires 12 by an elevating drive means 13 installed in the mobile body 7, the movable rail 6 can be moved up and down while maintaining its horizontal posture between an elevating upper limit position immediately below the mobile body 7 and a lowered position at an arbitrary height. Therefore, the storage rails 11*a* and 11*b* of the storage areas 11A and 11B are laid not only at a level at which they can be connected to both ends of the movable rail 6 at its elevating upper limit position but also at a plurality of upper and lower stages so that they can be connected to the movable rail 6 at each lowered position. In FIG. 2, the reference numeral 14 denotes a delivering-in main rail to the storage area 11A or 11B, 15 denotes an delivering-out main rail from the storage area 11A or 11B, and the ends of the movable rail 6 can be connected thereto by transverse movement of the mobile body 7 and elevating/lowering of the movable rail 6.

On the movable rail 6 hung down on the mobile body 7 constituted as described above, at both ends thereof, delivery units 16A and 16B are provided. The delivery units 16A and 16B have the same constitution and each has a friction drive wheel 17 and a friction drive wheel moving means 18. The friction drive wheel moving means 18 composes, as shown in FIG. 3 through FIG. 5, a rod-like in-and-out movable body 20 supported on a slide guide rail 19 attached to the upper side of an end of the movable rail 6 so as to reciprocate in the length direction of the movable rail 6, an actuator 21 which is connected to an inner end of this rod-like in-and-out movable body 20 and reciprocates the rod-like in-and-out movable body 20, and a gate-shaped frame 22 that is joined to an outer end of the rod-like in-and-out movable body 20 and covers the movable rail 6 from above, and as the actuator 21, an electric screw cylinder 24 to be driven by a motor 23 is used.

The friction drive wheel 17 is provided on the lower end of a vertical supporting column 22*a* on one side of the gate-shaped frame 2. Namely, a bearing member 25 is attached to the lower end of the vertical supporting column 22*a*, a reducer-equipped motor 28 is mounted on a movable base 27 supported so as to swing horizontally via the vertical support shaft 26 on this bearing member 25, the friction drive wheel 17 is attached to a vertical output shaft projecting to the lower side of the movable base 27 from this reducer-equipped motor 28, and between the movable base 27 and the bearing member 25, bolt and nut 29 for restricting a horizontal swinging range of the movable base 26 are interposed, and the friction drive wheel 17 is urged inward (to a position immediately below the movable rail 6) by a spring 30 interposed between the movable base 27 and the bearing member 25 via the bolt and nut 29. On the lower end of the vertical supporting column 22*b* on the opposite side of the gate-shaped frame 22, a backup roller 31 is pivotally supported via a bearing member 32 so as to face the friction drive wheel 17.

Figure 3:
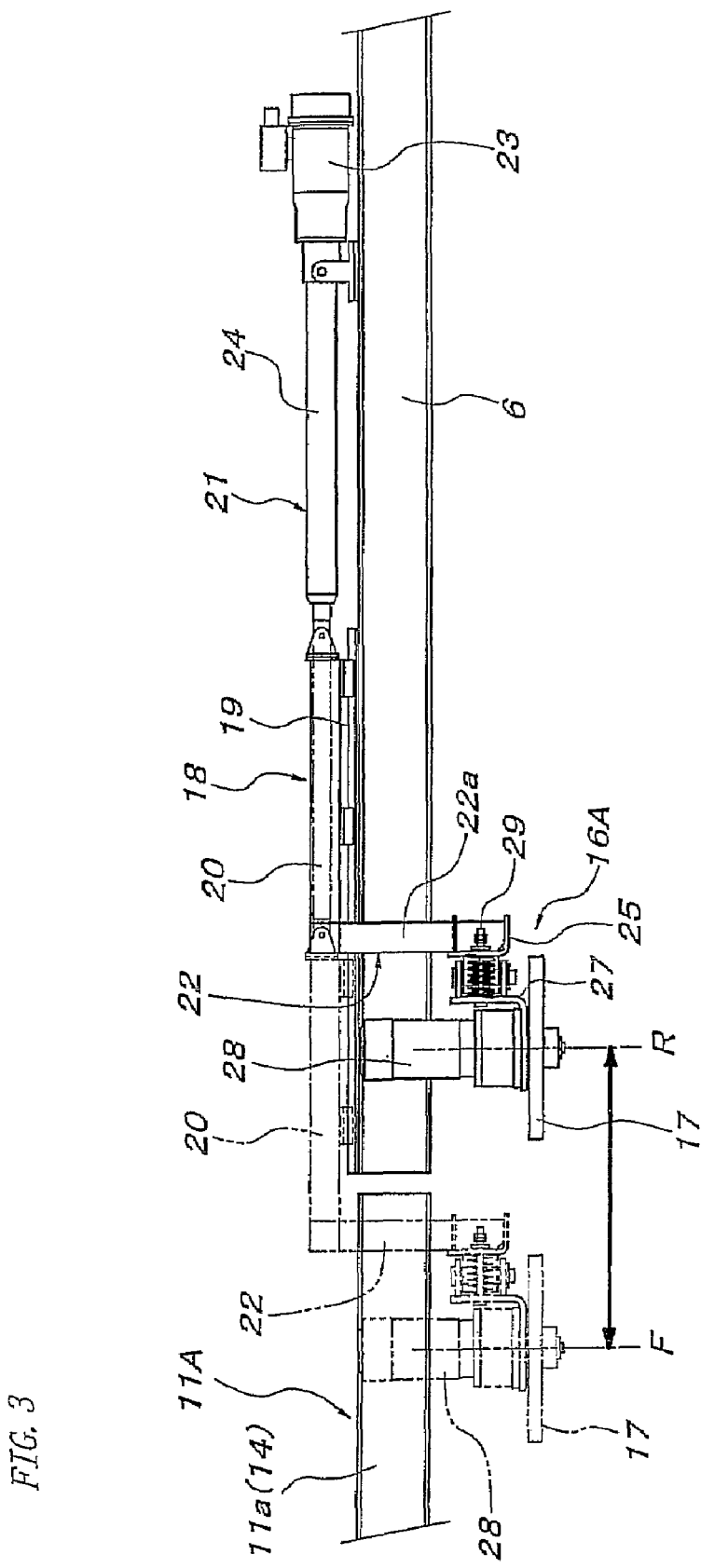
FIG. 3 is a side view of a main part describing a delivery unit on one side of the same first embodiment.

According to the friction drive wheel moving means 18 constituted as described above, when the rod-like in-and-out movable body 20 is drawn back to a retreating limit position by the actuator 21 (electric screw cylinder 24) as shown by the solid line in FIG. 3, the friction drive wheel 17 and the backup roller 31 supported on the gate-shaped frame 22 are positioned at a retreating position R slightly inward from the end of the movable rail 6, and when the rod-like in-and-out movable body 20 is sent out to a forwarding limit position by the actuator 21 (electric screw cylinder 24) as shown by the virtual line in FIG. 3, the friction drive wheel 17 and the backup roller 31 supported by the gate-shaped frame 22 are positioned at an forwarding position forwarded by a predetermined distance outward from the end of the movable rail 6.

Figure 4:
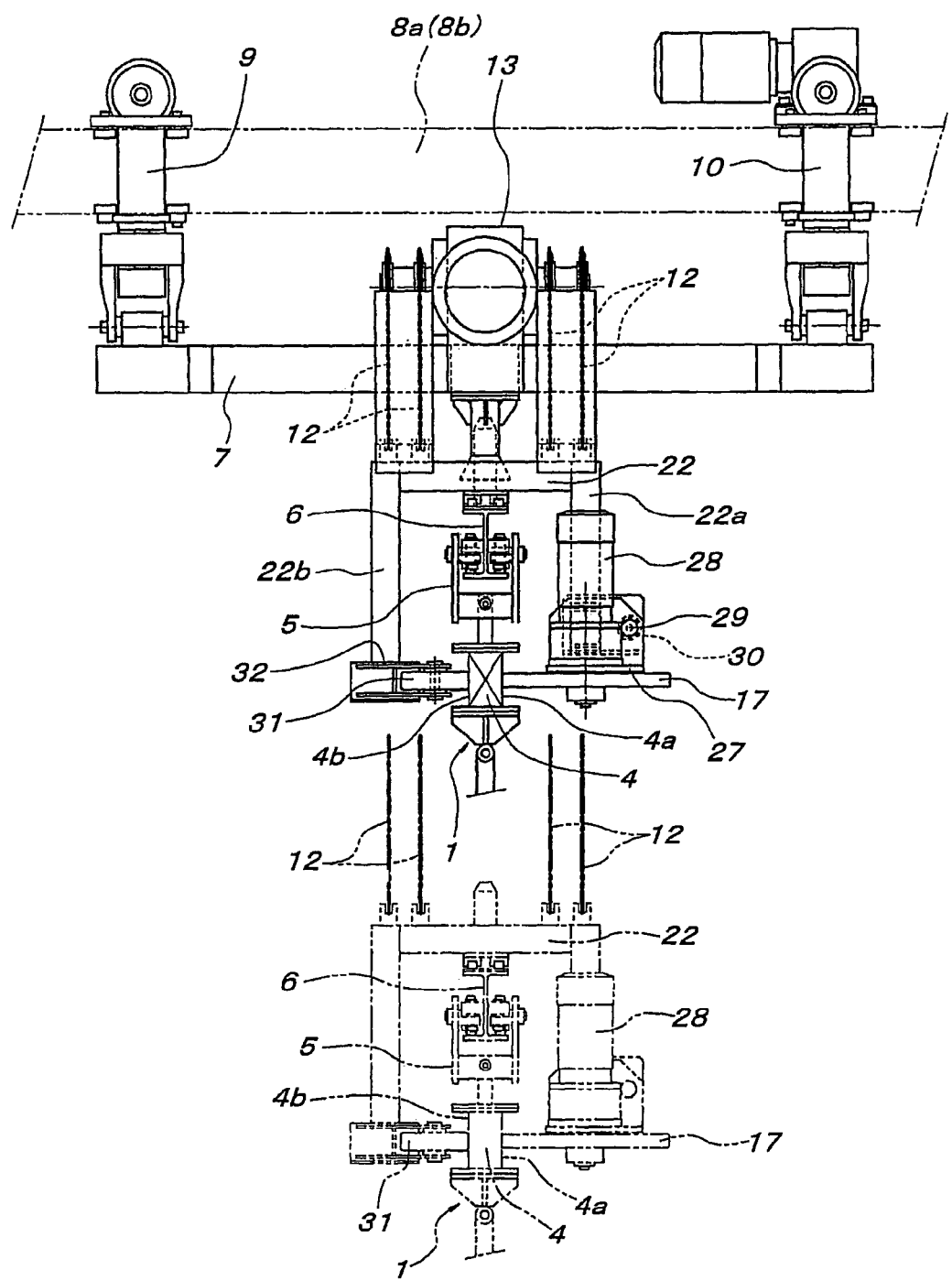
FIG. 4 is a front view showing an acting state of the delivery unit shown in FIG. 3.
Figure 5:
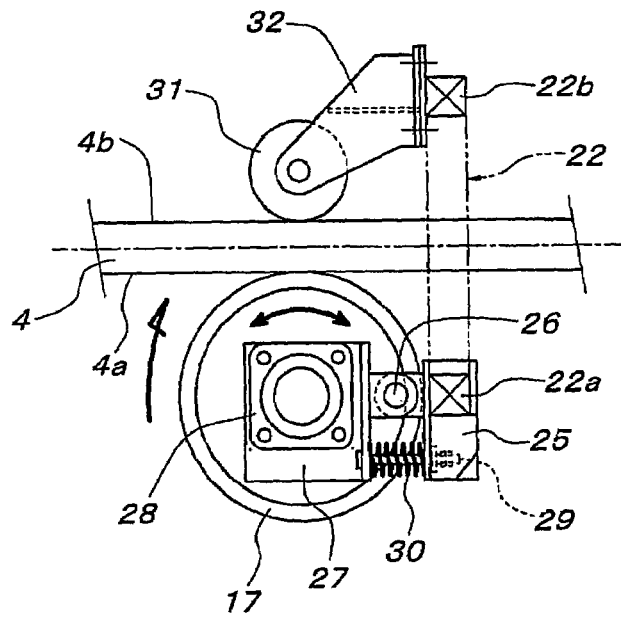
FIG. 5 is a plan view of a main part of the delivery unit shown in FIG. 4.

As aforementioned, the movable rail 6 has a length almost equal to the entire length of the travelling carrier 1 (load bar 4), so that when the entirety of the travelling carrier 1 is transferred onto the movable rail 6 via the trolleys 5 as shown in FIG. 1, both ends of the load bar 4 of the travelling carrier 1 are positioned between the friction drive wheels 17 and the backup rollers 31 at the retreating positions R (see FIG. 3) of the delivery units 16A and 16B provided on both ends of the movable rail 6 (see FIG. 4). At this time, the urging force of the spring 30 is set so that the friction drive wheel 17 sandwiches with a predetermined pressure the load bar 4 of the travelling carrier 1 between the same and the backup roller 31. When the travelling carrier 1 is not transferred onto the movable rail 1, the horizontal swinging range of the friction drive wheel 17 is set by the bolt and nut 29 so that the load bar 31 of the travelling carrier 1 can enter between the friction drive wheel 17 and the backup roller 31 while pushing and opening the friction drive wheel 17.

The load bar 4 of the travelling carrier 1 has both left and right side surfaces formed into friction driving surfaces 4*a* and 4*b* continued across the entire length of the load bar, and as described above, by rotate-driving the friction drive wheels 17 while the load bar 4 is sandwiched between the friction drive wheels 17 and the backup rollers 31, the travelling carrier 1 is friction-driven and propelled in a rotating direction of the friction drive wheels 17. The friction drive wheel 17 must be switchable between a driving state in that it propels the travelling carrier 1 via the friction driving surface 4*a* of the load bar 4 and a driving release state. In this embodiment, the friction drive wheel 17 cannot be forcibly separated from the friction driving surface 4*a* of the load bar 4 in the travelling carrier 1, so that as the reducer-equipped motor 28 for driving the friction-driven wheel 17, a motor that allows the friction-driven wheel 17 to freely rotate when it is not energized (driving release state) is used, or when the reducer of the reducer-equipped motor 28 is a type which cannot be rotated from the side of the friction drive wheel 17 side, a clutch is interposed between a final-shift reducing shaft of this reducer and a vertical output shaft to which the friction drive wheel 17 is attached, and by turning the clutch off as appropriate, the friction drive wheel 17 can be made rotatable freely (driving release state).

To describe a method for using the delivery equipment for the travelling carrier 1 according to the embodiment described above, when the travelling carrier 1 is stored in the storage area 11A or 11B, the travelling carrier 1 to be stored is fed by appropriate propelling means to a predetermined terminal position of the delivering-in main rail 14, and while the mobile body 7 is stopped at a predetermined position at which the movable rail 6 is connected to the terminal end of the delivering-in main rail 14, the friction drive wheel 17 of the delivery unit 16A adjacent to the delivering-in main rail 14 is moved forward from the retreating position R to the forwarding position F by the friction drive wheel moving means 18. Namely, by actuating the actuator 21, the rod-like in-and-out movable body 20 is moved forward and the friction drive wheel 17 and the backup roller 31 are integrally moved forward to the inside of the terminal region of the delivering-in main rail 14 via the gate-shaped frame 22. At this time, the friction drive wheel 17 has been switched into the driving release state and been made rotatable, so that in the process of forwarding of the friction drive wheel 17 and the backup roller 31, the load bar 4 of the travelling carrier 1 stopped in standby at the predetermined terminal position of the delivering-in main rail 14 relatively enter between the friction drive wheel 17 and the backup roller 31 moved to the forwarding position while pressing and opening the friction drive wheel 17 against the urging force of the spring 30 and rotating it by a frictional force, and when the friction drive wheel 17 and the backup roller 31 stop at the forwarding position F, the friction drive wheel 17 is made to pressure contact with the friction driving surface 4a as one side surface of the load bar 4 of the travelling carrier 1 by the urging force of the spring 30.

Next, the friction drive wheel 17 of the delivery unit 16A is forcibly driven in a travelling carrier drawing-in direction by the reducer-equipped motor 28 and the travelling carrier 1 is friction-driven from the delivering-in main rail 14 to the movable rail 6 side via the friction driving surface 4a of the load bar 4, and simultaneously, the actuator 21 is actuated in reverse and the rod-like in-and-out movable body 20 is retreated, the friction drive wheel 17 and the backup roller 31 are integrally retreated to the movable rail 6 side via the gate-shaped frame 22 and stopped at the retreating position R. Then, when the travelling carrier 1 continuously drawn to the movable rail 6 side by the friction drive wheel 17 rotate-driven at the retreating position R is entirely drawn to the inside of the region between both ends of the movable rail 6, the rotate-driving of the friction drive wheel 17 by the reducer-equipped motor 28 is stopped, whereby drawing-in transfer of the travelling carrier 1 to the movable rail 6 side by the delivery unit 16A is ended. At the final stage of the drawing-in transfer of the travelling carrier 1 to the movable rail 6 side, the leading head of the load bar 4 of the travelling carrier 1 enters between the friction drive wheel 17 and the backup roller 31 of the delivery unit 16B on the opposite side, so that the friction drive wheel 17 of the delivery unit 16B must be switched to the driving release state in that it is rotatable.

As described above, when the travelling carrier 1 to be stored is drawn and transferred to the movable rail 6 side, then, the power trolley 9 of the mobile body 7 is operated to traverse the mobile body 7 to a region adjacent to the storage area 11A or 11B along the guide rail 8a or 8b, and the mobile body 7 is stopped at a position corresponding to the empty storage rail 11a or 11b in which the travelling carrier 1 should be stored, that is, the storage rail 11a or 11b for the delivering-in operation. When the storage rail 11a or 11b for the delivering-in operation is at a lower level, as shown by the virtual line in FIG. 1, the movable rail 6 that supports the travelling carrier 1 is lowered by unwinding the hanging wires 12 by operating the elevating drive means 13, and the movable rail 6 is stopped at a level to be connected to the storage rail 11a or 11b at the target level. Of course, it is also possible that this lowering of the movable rail 6 is coincided with the transverse movement of the mobile body 7 to shorten the cycle time.

Next, the delivery unit 16A or 16B adjacent to the storage rail 11a or 11b for the delivering-in operation is operated, and the travelling carrier 1 supported on the movable rail 6 is sent out to the storage rail 11a of the storage area 11A or the storage rail 11b of the storage area 11B. For example, when the travelling carrier 1 is sent out to the storage rail 11a of the storage area 11A, the friction drive wheel 17 of the delivery unit 16A is rotate-driven in a sending-out direction by the reducer-equipped motor 28, and the travelling carrier 1 whose load bar 4 is sandwiched between this friction drive wheel 17 and the backup roller 31 is sent out to the storage rail 11a side to which the movable rail 6 is connected by a frictional force between the friction drive wheel 17 and the friction driving surface 4a of the load bar 4, and simultaneously, the friction drive wheel 17 is moved forward by the friction drive wheel moving means 18 from the retreating position R to the forwarding position F. Then, even after reaching the forwarding position F, the travelling carrier 1 is sent out to the storage rail 11a side by the friction drive wheel 17 being driven to rotate, and when the entirety of this travelling carrier 1 is transferred to the inside of the region of the storage rail 11a, the rotate-driving of the friction drive wheel 17 by the reducer-equipped motor 28 is stopped, whereby sending-out transfer of the travelling carrier 1 from the movable rail 6 side to the storage rail 11a side by the delivery unit 16A is ended.

When the sending-out transfer of the travelling carrier 1 to the side of the storage rail 11a for the delivering-in operation is ended, after the friction drive wheel 17 at the forwarding position is switched into the driving release state in that it is rotatable, this friction drive wheel 17 and the backup roller 31 are retreated to the retreating position R by the friction drive wheel moving means 18. At this time, the friction drive wheel 17 is freely rotatable, so that even if the friction drive wheel 17 is made to pressure contact with the load bar 4 (friction driving surface 4a) of the travelling carrier 1 sent out to the storage rail 11a due to the urging force of the spring 30, the sent-out travelling carrier 1 is not drawn back again to the movable rail 6 side according to the movement of the friction drive wheel 17 to the retreating position R.

When the storage rail for the delivering-in operation is within the storage area 11B on the opposite side, by using the friction drive wheel 17 and the friction drive wheel moving means 18 of the delivery unit 16B on the side adjacent to the storage rail 11b for the delivering-in operation, the travelling carrier 1 supported on the movable rail 6 is sent out to the storage rail 11b side for the delivering-in operation as described above.

When the travelling carrier 1 supported on the storage rail 11a or 11b of the storage area 11A or 11B is delivered out to the delivering-out main rail 15, the mobile body 7 is moved transversely and the movable rail 6 is lowered with respect to the mobile body 7 as appropriate so that the movable rail 6 is connected to the storage rail 11a or 11b on which the travelling carrier 1 to be delivered out is supported, that is, to the storage rail 11a or 11b for the delivering-out operation, and thereafter, the delivery unit 16A or 16B on the side adjacent to the storage rail 11a or 11b for this delivering-out operation is operated in the same manner as in the drawing-in transfer of the travelling carrier 1 from the delivering-in main rail 14 to the movable rail 6 described above. Then, when the travelling carrier 1 to be delivered out is completely drawn and transferred to the movable rail 6 side, the mobile body 7 is traversed and the movable rail 6 is elevated with respect to the mobile body 7 as appropriate so that the movable rail 6 is connected to the delivering-out main rail 15, and thereafter, the delivery unit 16B on the side adjacent to the delivering-out main rail 15 is operated in the same manner as in the sending-out transfer of the travelling carrier 1 from the movable rail 6 to the storage rail 11a or 11b for the delivering-in operation described above.

When the storage rails 11a and 11b of the storage areas 11A and 11B, the delivering-in main rail 14, and the delivering-out main rail 15 are all laid only at the same level, the movable rail 6 is not required to elevate and lower with respect to the mobile body 7, and the movable rail 6 can be fixed at a fixed level so that the movable rail 6 can be connected to any of the storage rails 11a and 11b, the delivering-in main rail 14, and the delivering-out main rail 15 only by the transverse movement of the mobile body 7. When the storage rail 11a or 11b, the delivering-in main rail 14, and the delivering-out main rail 15 are all disposed on either one side with respect to the movable rail 6, the delivery unit 16A or 16B is provided on only one end of the movable rail 6. Furthermore, one rail can be commonly used as the delivering-in main rail 14 and the delivering-out main rail 15.

The travelling carrier delivery equipment of the invention can be used not only for delivery of the travelling carrier 1 in and out of the storage area 11A or 11B as in the embodiment described above, but also used as delivery equipment for branching and joining travelling carriers among a plurality of travelling paths each having a propelling drive means for the travelling carrier, and as equipment for changing the front and rear direction of the travelling carrier 1 in the middle of one travelling path.

Figure 6:
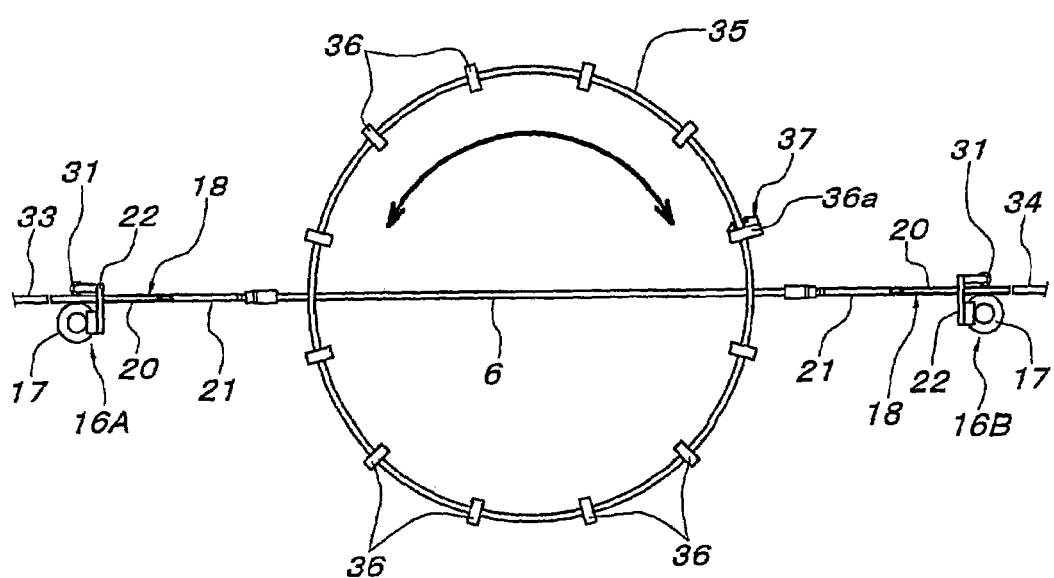
FIG. 6 is a schematic plan view showing another use form.

FIG. 6 shows the outline of a constitution in the case where the travelling carrier delivery equipment of the invention is used as equipment for changing the front and rear direction of the travelling carrier 1, and the movable rail 6 is supported rotatably horizontally around a rotation center at the central position of the entire length thereof, and when the movable rail 6 is at its home position, a delivering-in main rail 33 to be connected to one end of the movable rail 6 and a delivering-out main rail 34 to be connected to the other end of the movable rail 6 are laid.

According to this constitution, the travelling carrier 1 being stopped in standby at a predetermined terminal position of the delivering-in main rail 33 is drawn and transferred to the movable rail 6 side by a delivery unit 16A on the side adjacent to this delivering-in main rail 33 of the movable rail 6 at the home position, and then the movable rail 6 is rotated by 180 degrees to connect the end portion that had been connected to the delivering-in main rail 33 of the movable rail 6 to the delivering-out main rail 34. Then, the delivery unit 16A is operated again and the travelling carrier 1 drawn to the movable rail 6 is sent out in a reversed orientation to the delivering-out main rail 34, whereby the front and rear direction of the travelling carrier 1 is changed. At this time, the other delivery unit 16B is switched to the position adjacent to the delivering-in main rail 33, so that the delivery unit 16B can be used for the next drawing-in transfer of the travelling carrier 1 from the delivering-in main rail 33 to the movable rail 6 and sending-out transfer of this travelling carrier 1 to the delivering-out main rail 34, however, the delivery unit 16B can be omitted if a process of returning the empty movable rail into the original orientation exists. Of course, when the delivery units 16A and 16B are provided on both ends of the movable rail 6, it is also possible that the travelling carrier 1 is made to pass from the delivering-in main rail 33 to the delivering-out main rail 34 without changing its front and rear direction.

As means for rotate-driving the movable rail 6 supported rotatably, for example, as illustrated, it is possible that an annular guide rail 35 concentric with the rotation center of the movable rail 6 is attached to the upper side of the movable rail 6, this annular guide rail 35 is supported rotatably by guide roller units 36 fixed at a plurality of positions, and the movable rail 6 is rotate-driven together with the annular guide rail 35 by drive means 37 provided on one guide roller unit 36a. It is also possible that the position of the annular guide rail 35 is fixed, and the movable rail 6 is hung down at two points in the length direction on the annular guide rail 35 by a free trolley and a power trolley with rotating drive means.

Figure 7:
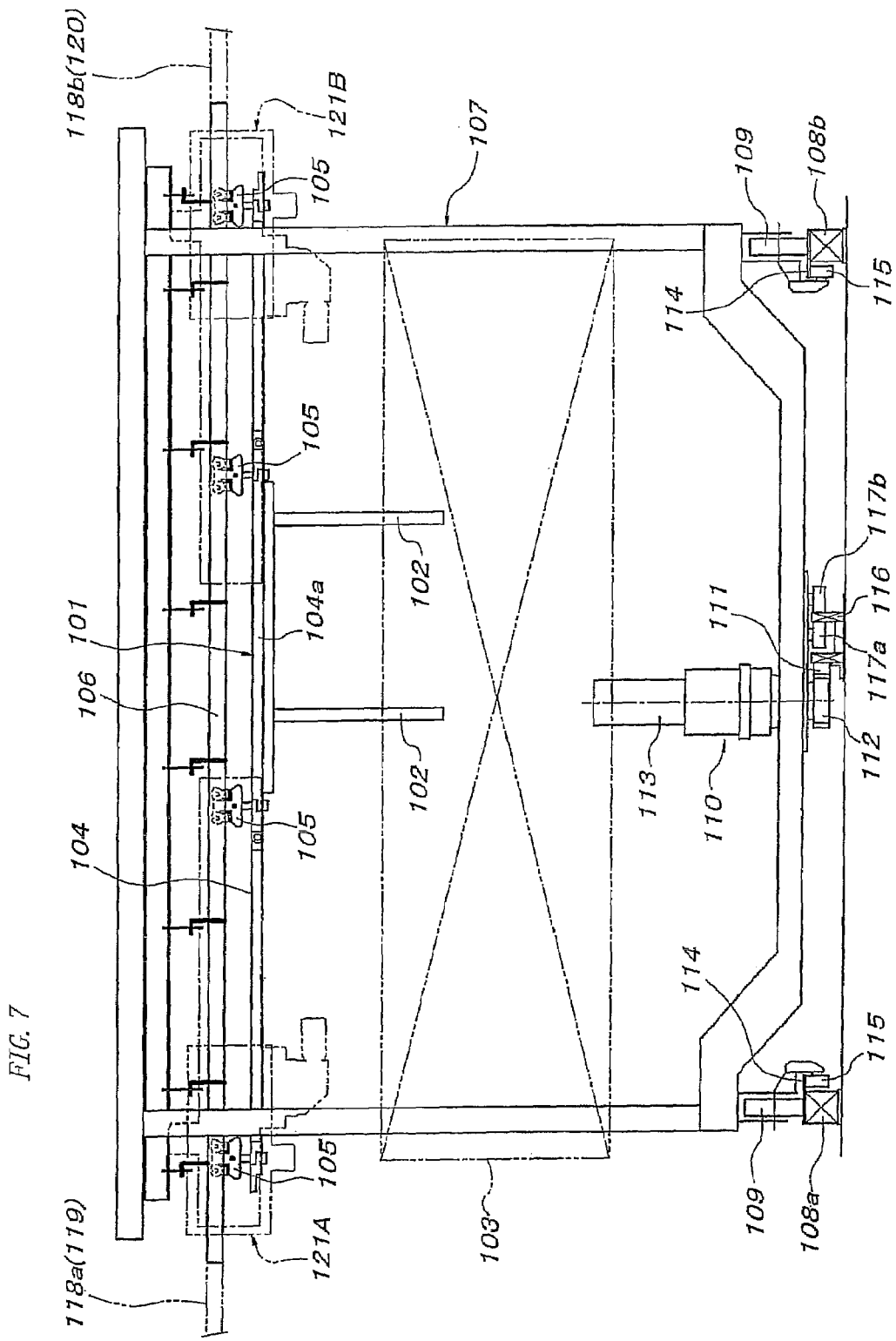
FIG. 7 is a schematic front view showing a second embodiment of the invention.
Figure 8:
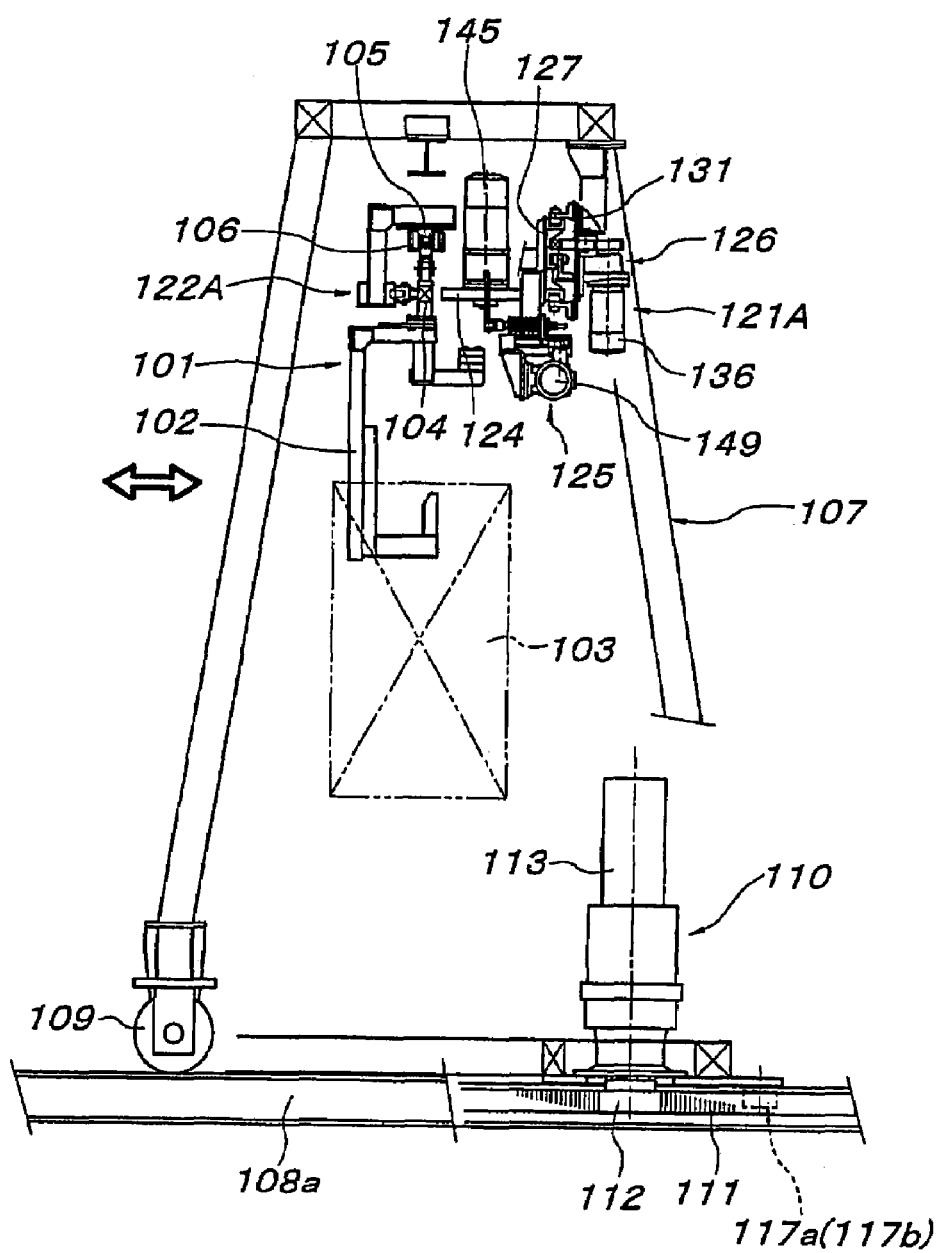
FIG. 8 is a partially broken schematic side view of the same second embodiment of the invention.
Figure 9:
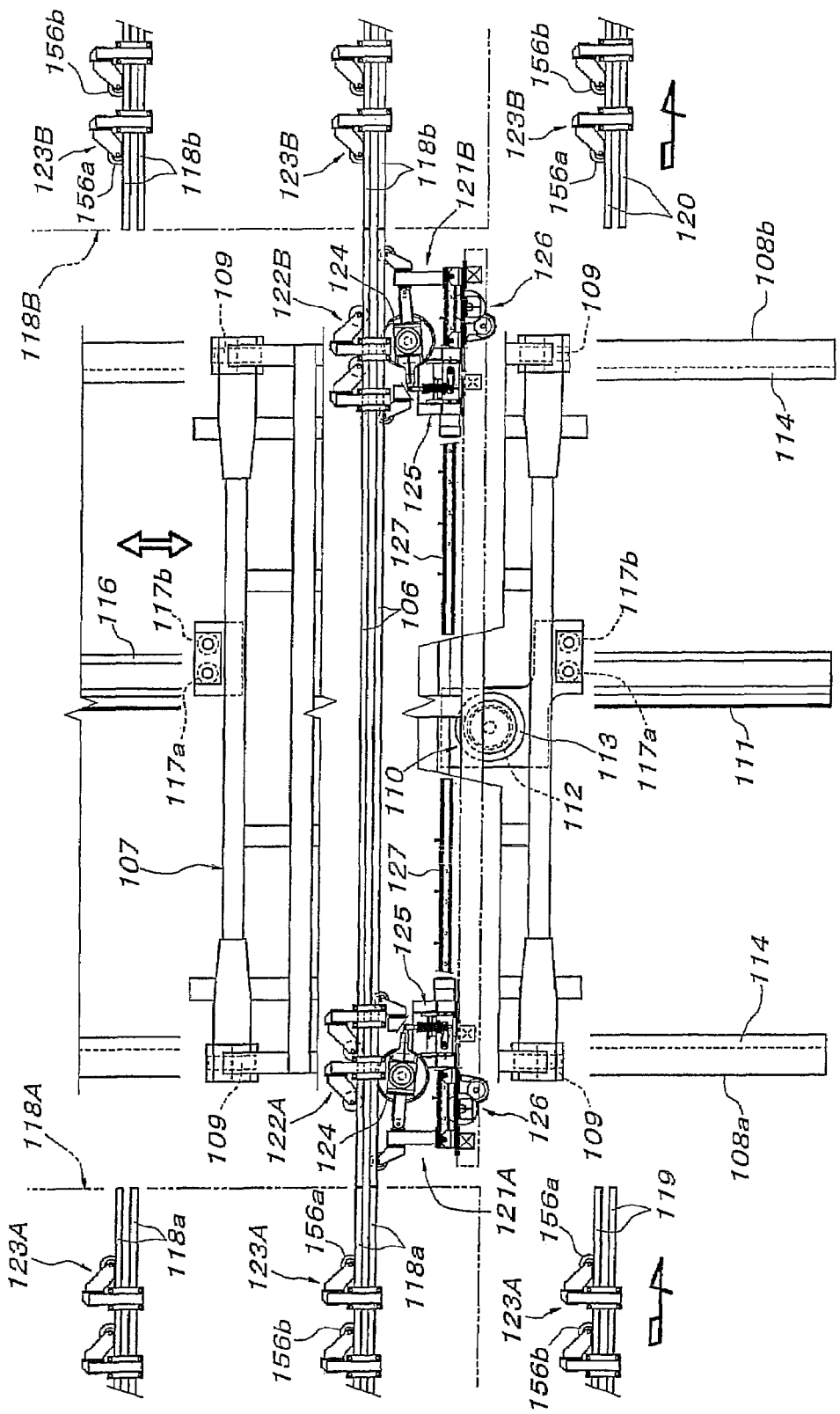
FIG. 9 is a partially broken plan view of the same second embodiment of the invention.

A second embodiment of the invention will be described with reference to FIG. 7 through FIG. 14. In FIG. 7 and FIG. 8, 101 denotes a travelling carrier having a load bar 104 for hanging a long carried object 103 via hangers 102 and trolleys 105 attached to both ends and a plurality of intermediate points of this load bar 104. The load bar 104 is divided so as to be bent at least horizontally around a vertical axis at a plurality of points (positions of the trolleys 105) in the length direction as conventionally known.

The reference numeral 106 denotes a movable rail, which has an entire length almost equal to the entire length of the travelling carrier 101 (load bar 104) (in the illustration, an entire length slightly longer than the entire length of the load bar 104), and can hang one travelling carrier 101 movably via the trolleys 105. The reference numeral 107 denotes a movable rail hanging mobile body (hereinafter, abbreviated to mobile body) for hanging the movable rail 106 down, and is a gate-shaped carriage type supported movably transversely in the horizontal direction orthogonal to the length direction of the movable rail 106 via travelling wheels 109 pivotally supported at four corners on the bottoms of guide rails 108a and 108b in two rows laid on the floor. The reference numeral 110 denotes a travelling drive means of the mobile body 107, and includes a rack gear 111 laid sideways on the floor midway between the guide rails 108a and 108b, and a reducer-equipped motor 113 which is set on the mobile body 107 and a pinion gear 112 that engages with the rack gear 111 is attached thereto.

To prevent floating of the mobile body 107, the mobile body 107 is provided with horizontal axis rollers 115 adjacent to the lower sides of projecting rail plates 114 projecting inward from the guide rails 108a and 108b, and to restrict the travelling direction of the mobile body 107, on the mobile body 107, a pair of vertical axis rollers 117a and 117b that sandwich the guide rail 116 that is adjacent to the rack gear 111 and laid on the floor from both left and right sides are provided at two front and rear points in a travelling direction.

On both left and right sides of the travelling path of the mobile body 107, storage areas 118A and 118B are disposed. In these storage areas 118A and 118B, storage rails 118a and 118b to which both front and rear ends of the movable rail 106 can be simultaneously connected by means of transverse movement of the mobile body 107 are arranged parallel at appropriate intervals in the travelling direction of the mobile body 107. On the outer sides of the storage areas 118A and 118B, a delivering-in main rail 119 and a delivering-out main rail 120 to which both front and rear ends of the movable rail 106 can be simultaneously connected by means of transverse movement of the mobile body 107 are laid.

On both ends of the movable rail 106 hung down on the mobile body 107 constituted as described above, as shown in FIG. 7 and FIG. 9, delivery units 121A and 121B and backup means 122A and 122B are provided, and on delivery ends of the storage rails 118a and 118b and the delivering-in and delivering-out main rails 119 and 120 to be connected to the movable rail 106, backup means 123A and 123B are provided.

Figure 10:
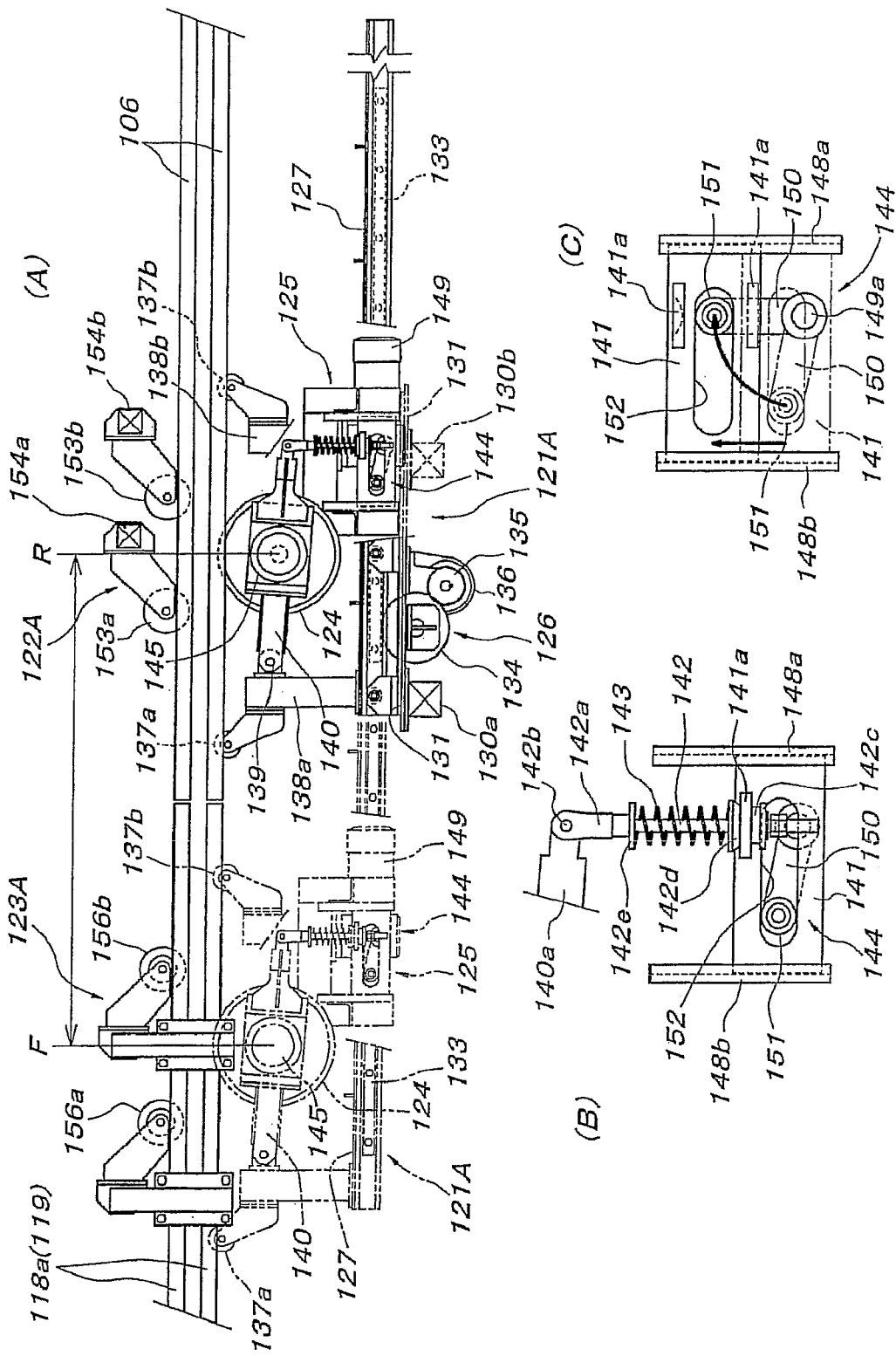
FIG. 10A is a plan view of a main part describing a travelling carrier transferring portion on one end side of a movable rail in the same second embodiment.
FIG. 10B is a plan view of a main part of friction drive wheel position switching means.
FIG. 10C is a plan view showing an acting state of a drive member of the same friction drive wheel position switching means.

The delivery units 121A and 121B are symmetrical in the front and rear direction, and propel the travelling carrier 101 by using the friction driving surface 104A formed by one side surface continued across the entire length of the load bar 104 of the travelling carrier 1, and to describe with reference to one delivery unit 121A shown in FIG. 10, each of the delivery units 121A and 121B composes a friction rive wheel 124 that can be made to pressure contact with the friction driving surface 104a, friction drive wheel position switching means 125 that switches the position of this friction drive wheel 124 between a driving position at which it is made to pressure contact with the friction driving surface 104a and a driving release position spaced from the friction driving surface 104a, and friction drive wheel moving means 126 that reciprocates the friction drive wheel 124 between a retreating position R at which it can be made to pressure contact with the friction driving surface 104a of the travelling carrier 101 supported on the movable rail 106 and a forwarding position F at which it can be made to pressure contact with the friction driving surface 104a of the travelling carrier 101 supported on the storage rail 118a or 118b, etc.

To describe the detailed structure of each of the delivery units 121A and 121B with reference to the one delivery unit 121A shown in FIG. 10 through FIG. 14, the friction drive wheel moving means 126 composes a movable body 127 supported by the mobile body 107 movably parallel to the movable rail 106, and drive means 128 that reciprocates this movable body 127. The movable body 127 has an upward groove-shaped rail 129 on the upper side, a downward groove-shaped rail 129b on the lower side, and a sideway groove-shaped rail 129c positioned midway between both groove-shaped rails 129a and 129b, and the movable body 107 is supported on a fixed substrate 131 attached via a pair of front and rear vertical supporting materials 130a and 130b to the mobile body 107 via a plurality (three in the illustration) of upper vertical axis rollers 132a that are attached to the inner upper side of the fixed substrate 13 and fit into the groove-shaped rail 129a, a plurality (three in the illustration) of lower vertical axis rollers 132b that are attached to the inner lower side of the fixed substrate 131 and fit into the lower groove-shaped rail 129b, and a plurality (three in the illustration) of horizontal axis rollers 132c that are attached at an inner intermediate height of the fixed substrate 131 and fit into the sideway groove-shaped rail 129c, in a manner enabling the movable body to reciprocate parallel to the movable rail 106 at a position on one left or right side of the movable rail 106. The drive means 128 includes a rack gear 133 attached to the upper side of the sideway groove-shaped rail 129c of the movable body 127 parallel to the sideway groove-shaped rail 129c, a pinion gear 134 that is pivotally supported by a vertical support shaft on the fixed substrate 134 so as to penetrate the fixed substrate 131 in an inner and outer direction and engages with the rack gear 133, and a reducer-equipped motor 136 which has a power transmission gear 135 that engages with this pinion gear 134 on a vertical output shaft and is attached to the outside of the fixed substrate 131.

On the inner side of the front half of the movable body 127, a pair of front and rear guide rollers 137a and 137b are provided. The pair of front and rear guide rollers 137a and 137b are pivotally supported by the vertical support shaft via bearing members on the tip ends of a pair of front and rear horizontal supporting materials 138a and 138b provided to project inward from the movable body 127 so as to be adjacent to the friction driving surface 104a (one side surface of the load bar 104) of the travelling carrier 101 supported on the movable rail 106.

The friction drive wheel switching means 125 includes a friction drive wheel supporting member 140 pivotally supported so as to swing to the left and right horizontally via the vertical support shaft 139 on the tip end of the horizontal supporting material 138a on the tip end side of the movable rail 106 of the pair of front and rear horizontal supporting materials 138a and 138b supporting the pair of front and rear guide rollers 137a and 137b, a drive member 141 supported movably transversely to the left and right horizontally on the movable body 127, a joint 142 that joins this drive member 141 and the friction drive wheel supporting member 140 in a manner allowing these to relatively move in a direction approaching and separating from each other in a predetermined range, a spring 143 that urges the friction drive wheel supporting member 140 in a direction separating from the drive member 141, and a drive means 144 that moves the drive member 141 transversely, and the friction drive wheel 124 is attached to the vertical output shaft of the reducer-equipped motor 145 mounted on the friction drive wheel supporting member 140. This friction drive wheel 124 is at a height adjacent to the friction driving surface 104a (one side surface of the load bar 104) of the travelling carrier 101 supported on the movable rail 106, and by swinging the friction drive wheel supporting member 140 to the left and right horizontally, the friction drive wheel is selectively switched between a driving state in that it is made to pressure contact with the friction driving surface 104a of the travelling carrier 101 and a driving release state in that it is spaced from the friction driving surface 104a.

In more detail, the drive member 141 is supported on a reversed-C-shaped plan member 147 supported by a pair of front and rear vertical supporting materials 146a and 146b on the movable body 127 via a pair of front and rear slide guide rails 148a and 148b movably transversely to the left and right horizontally. The base end 142a of the joint 142 is pivotally supported on a tip end member 140a hung down from the tip end of the friction drive wheel supporting member 140 by a vertical support shaft 142b, and to a free end of the joint 142 penetrating a power transmission member 141a provided to stand from the driving member 141, a stopper member 142c is attached. The spring 143 is formed by a compression coil spring freely fitted to the joint 142 between a spring bearing plate 142d that is freely fitted to the joint 142 on the base end 142a side with respect to the transmission member 141a and fitted to the power transmission member 141a and a spring bearing plate 142d provided on the base end 142a of the joint 142. The drive means 144 composes a reducer-equipped motor 149 supported by the reversed-C-shaped plan member 147, a drive lever 150 attached to a vertical output shaft 149a of the reducer-equipped motor 149 on the lower side of the drive member 141, and a cam hole 152 formed in the front and rear direction (parallel to the movable rail 106) in the drive member 141 so that a vertical axis roller 151 pivotally supported on the free end of this drive lever 150 is freely fitted therein.

Figure 11:
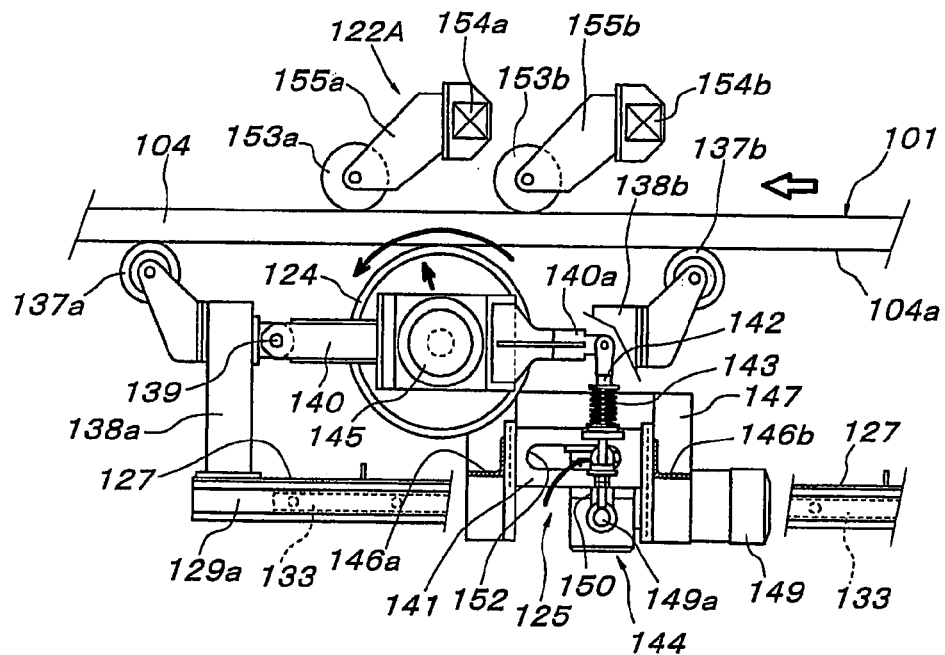
FIG. 11 is a partially broken plan view of a main part describing a sending-out transferring action of a travelling carrier in the same second embodiment.
Figure 12:
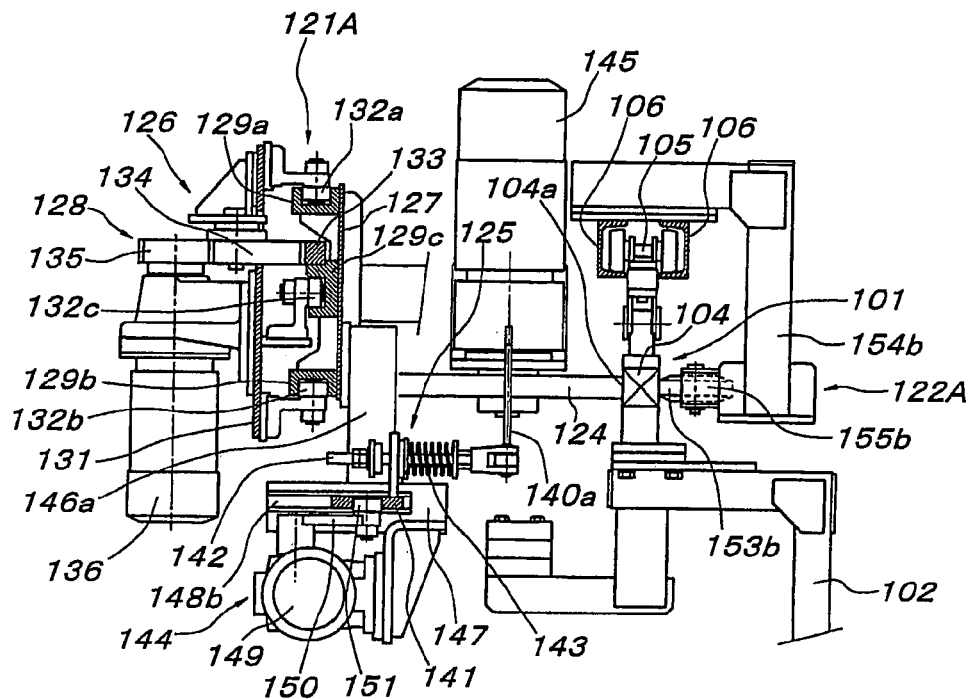
FIG. 12 is a partially broken side view of the same main part.
Figure 13:
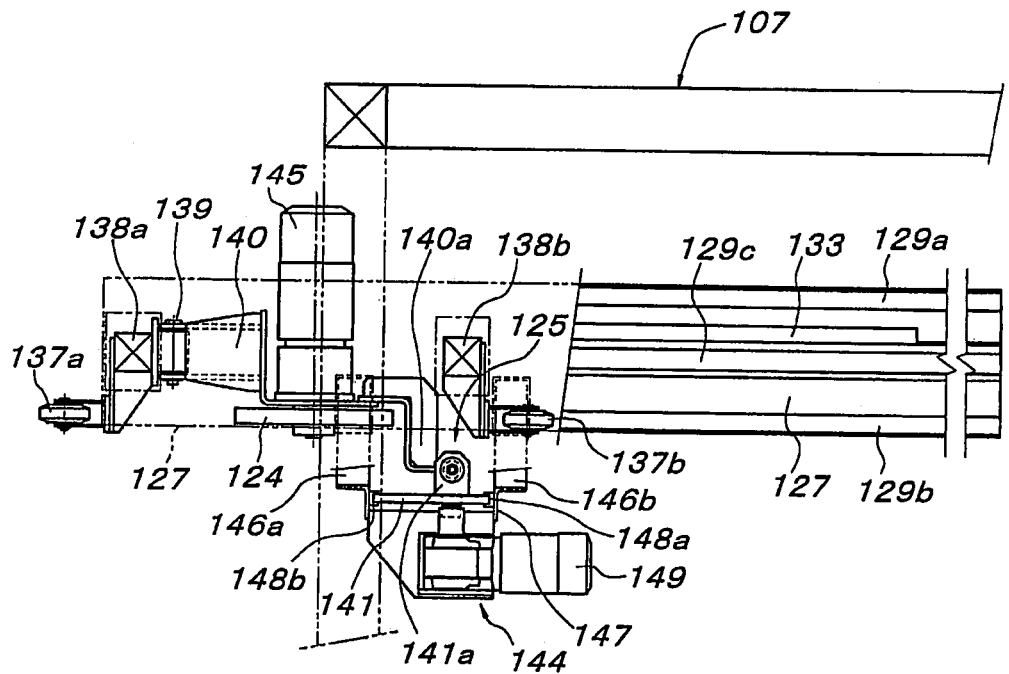
FIG. 13 is a front view of a main part showing a friction drive wheel and position switching means for the same in the same second embodiment.
Figure 14:
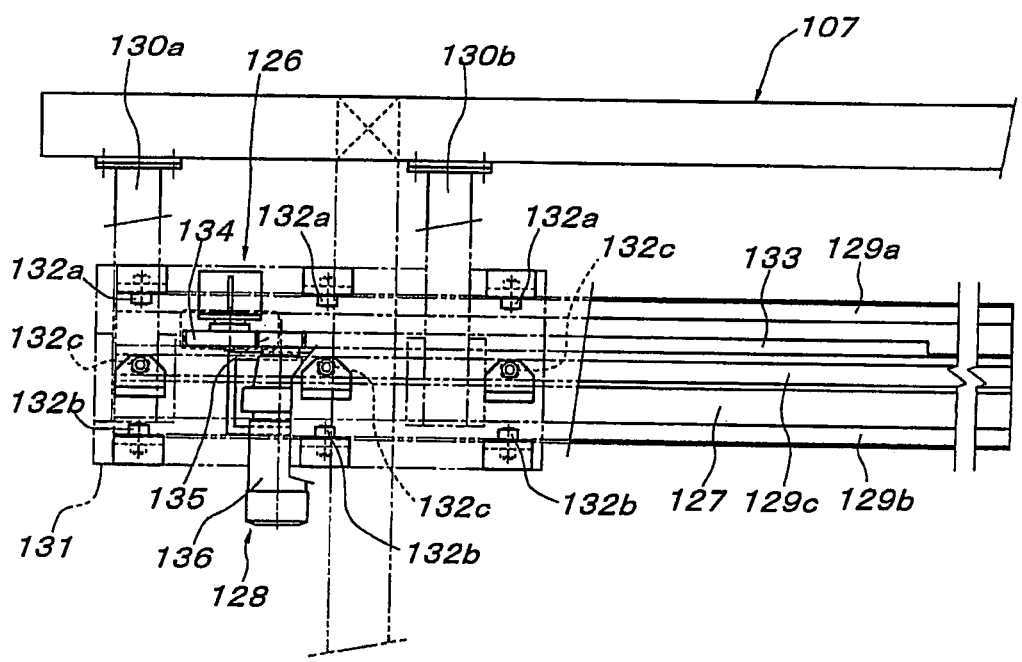
FIG. 14 is a front view of a main part showing friction drive wheel moving means in the same second embodiment.

The backup means 122A and 122B paired with the respective delivery units 121A and 121B have, as shown in FIG. 10 through FIG. 12, a pair of front and rear vertical axis rollers 153a and 153b that sandwich the load bar 104 of the travelling carrier 101 supported on the movable rail 106 between the same and the friction drive wheel 124 at the retreating position R, and these vertical axis rollers 153*a* and 153*b* are supported on the lower ends of a pair of front and rear vertical supporting materials 154*a* and 154*b* continuously fixed to the movable rail 106 so as to be hung down on the opposite side of the side of the friction drive wheel 124 with respect to the travelling path of the travelling carrier 101 so that the vertical axis rollers are positioned on both front and rear sides with respect to the friction drive wheel 124 at the retreating position R via bearing members 155*a* and 155*b*. On the delivery ends of the storage rails 118*a* and 118*b* and the delivering-in and delivering-out main rails 119 and 120 to be connected to the movable rail 106, backup means 123A and 123B are provided. These backup means 123A and 123B have a pair of front and rear vertical axis rollers 156A and 156*b* that sandwich the load bar 104 of the travelling carrier 101 between the same and the friction drive wheel 124 at the forwarding position F as shown in FIG. 10, and these vertical axis rollers 156*a* and 156*b* are provided on the storage rails 118*a* and 118*b* and the delivering-in and delivering-out main rails 119 and 120 so as to be positioned on both front and rear sides of the friction drive wheel 124 at the forwarding position F by the same attaching structure as that of the vertical axis rollers 153*a* and 153*b* in the aforementioned backup means 122A and 122B.

A method for using the delivery equipment for the travelling carrier 101 according to the embodiment will be described. To store the travelling carrier 101 in the storage area 118A or 118B shown in FIG. 9, the travelling carrier 101 to be stored is sent to a predetermined terminal position of the delivering-in main rail 119 by appropriate propelling means, and while the mobile body 107 stops at a predetermined position at which the movable rail 106 is connected to the terminal end of the delivering-in main rail 119, upon switching the friction drive wheel 124 of the delivery unit 121A on the side adjacent to the delivering-in main rail 119 to the driving release position by the friction drive wheel position switching means 125, the friction drive wheel is moved forward from the retreating position R to the forwarding position F by the friction drive wheel moving means 126.

Namely, as shown in FIGS. 10A and 10B, the drive lever 150 is rotated in reverse by a predetermined angle by the reducer-equipped motor 149 of the friction drive wheel position switching means 125 to slide the drive member 141 outward so as to move away from the movable rail 106 via the vertical axis roller 151 and the cam hole 152, the friction drive wheel supporting member 140 is swung horizontally around the vertical support shaft 139 outward so as to move away from the movable rail 106 via the power transmission member 141*a*, the stopper member 142*c* of the joint 142, the joint 142, and the vertical support shaft 142*b*, and the friction drive wheel 124 supported by the friction drive wheel supporting member 140 is switched to the driving release position at which it is not in contact with the friction driving surface 104*a* of the travelling carrier 101. Then, the pinion gear 134 is rotate-driven forward via the power transmission gear 135 by the reducer-equipped motor 136 of the friction drive wheel moving means 126, the movable body 127 is moved forward via the rack gear 133 parallel to the movable rail 106 via the upward groove-shaped rails 129*a* through 129*c* on the upper side of the movable body 127 side and the rollers 132*a* through 132*c* on the fixed substrate 131 side, whereby the friction drive wheel 124 supported on the movable body 127 is moved from the retreating position R to the forwarding position F (see the virtual line of FIG. 10A) integrally with the pair of front and rear guide rollers 137*a* and 137*b*.

Due to the above-described action, the friction drive wheel 124 and the pair of front and rear guide rollers 137*a* and 137*b* become adjacent to a position near the end on the movable rail 106 side of the load bar 104 of the travelling carrier 101 being stopped in standby at the predetermined terminal position of the delivering-in main rail 119, and the load bar 104 of the travelling carrier 104 is sandwiched from both left and right sides by the pair of front and rear vertical axis rollers 156*a* and 156*b* of the backup means 123A provided on the delivering-in main rail 119 and the pair of front and rear guide rollers 137*a* and 137*b* of the delivery unit 121A, whereby its orientation is restricted. In this state, the friction drive wheel 124 is switched from the driving release position to the driving position by the friction drive wheel position switching means 125. Namely, the drive lever 150 is rotated forward by a predetermined angle by the reducer-equipped motor 149 of the friction drive wheel position switching means 125, the drive member 141 is made to slide inward to approach the movable rail 106 via the vertical axis roller 151 and the cam hole 152, the friction drive wheel supporting member 140 is swung horizontally around the vertical support shaft 139 inward to approach the movable rail 106 via the power transmission member 141*a*, the spring bearing plate 142*d* of the joint 142, the spring 143, the spring bearing plate 142*e* of the joint 142, the joint 142, and the vertical support shaft 142*b*, and the friction drive wheel 124 supported by the friction drive wheel supporting member 140 is switched to the driving position at which the friction drive wheel is made to pressure contact with the friction driving surface 104*a* of the travelling carrier 101 due to compression reaction of the spring 143. At this time, the load bar 104 of the travelling carrier 101 is received by the pair of front and rear vertical axis rollers 156*a* and 156*b* of the backup means 123A and the friction drive wheel 124 presses the friction driving surface 104*a* at a middle position between the vertical axis rollers 156*a* and 156*b*, so that a necessary frictional force can be generated between the friction drive wheel 124 and the friction driving surface 104*a*.

Next, by rotate-driving the friction drive wheel 124 in the drawing-in direction of the travelling carrier 101 by the reducer-equipped motor 145, due to a frictional force between this friction drive wheel 124 and the friction driving surface 104*a* of the travelling carrier 101, the travelling carrier 101 stopped in standby at the predetermined terminal position of the delivering-in main rail 119 is drawn to the movable rail 106 side connected to the terminal end of the delivering-in main rail 119, and while the trolleys 105 transfer from the delivering-in main rail 119 to the movable rail 109, the travelling carrier 101 is transferred to the movable rail 106. Simultaneously with this drawing-in movement of the travelling carrier 101 by the friction drive wheel 124, the pinion gear 134 is rotate-driven in reverse via the power transmission gear 135 by the reducer-equipped motor 136 of the friction drive wheel moving means 126, the movable body 127 is retreated via the rack gear 133 parallel to the movable rail 106 via the upward groove-shaped rails 129*a* through 129*c* on the upper side of the movable body 127 side and the rollers 132*a* through 132*c* on the fixed substrate 131 side, whereby the friction drive wheel 124 supported on this movable body 127 is moved from the forwarding position F to the retreating position R (see the solid line in FIG. 10A) integrally with the pair of front and rear guide rollers 137*a* and 137*b*. Even in this state, the pair of front and rear vertical axis rollers 153*a* and 153*b* of the backup means 122A work on the friction drive wheel 124 similar to the pair of front and rear vertical axis rollers 156*a* and 156*b* of the backup means 123A, and enables reliable drawing-in movement of the travelling carrier 101.

By the above-described action, the friction drive wheel 124 returned to the retreating position R can draw and transfer the entirety of the travelling carrier 101 from the delivering-in main rail 119 to the movable rail 106 side, and in a state in that the entirety of the travelling carrier 101 is transferred to the movable rail 106, the driving of the friction drive wheel 124 by the reducer-equipped motor 145 is stopped, whereby the drawing-in transfer of the travelling carrier 101 to the movable rail 106 side from the delivering-in main rail 119 is completed. The load bar 104 of the travelling carrier 101 which is thus entirely transferred to the movable rail 106 side enters the inner side of the friction drive wheel 124 of the delivery unit 121B on the opposite side toward the end of this transferring process, so that it is preferable that the friction drive wheel 124 of this delivery unit 121B is prevented from being made to pressure contact with the friction driving surface 104a of the approaching travelling carrier 101 and causing resistance by switching the friction drive wheel 124 of this delivery unit 121B to the driving release position by the friction drive wheel position switching means 125.

When the travelling carrier 101 to be stored is drawn and transferred to the movable rail 106 side as described above, next, the travelling drive means 110 of the mobile body 107 is operated. Namely, the pinion gear 112 is rotate-driven by the reducer-equipped motor 113 to traverse the mobile body 107 to a region adjacent to the storage area 118A or 118B along the guide rail 108a or 108b via the rack gear 111 fixed to the floor side, and the mobile body 107 is stopped at a position at which the movable rail 106 is connected to the empty storage rail 118a or 118b in which the travelling carrier 101 should be stored, that is, the storage rail 118a or 118b for the delivering-in operation.

Next, the delivery unit 121A or 121B on the side adjacent to the storage rail 118a or 118b for the delivering-in operation is operated to send-out the travelling carrier 101 supported on the movable rail 106 to the storage rail 118a of the storage area 118A or the storage rail 118b of the storage area 118B. For example, to send-out the travelling carrier 101 to the storage rail 118a of the storage area 118A, the delivery unit 121A is operated to send-out and transfer the travelling carrier 101 from the movable rail 106 to the storage rail 118a. Namely, in a state in that the friction drive wheel 124 of the delivery unit 121A is switched to the driving position due to the last drawing-in transfer action of the travelling carrier 101 from the delivering-in main rail 119, when it is not returned to the driving release position thereafter, the friction drive wheel is left as it is, and if it is returned to the driving release position, as described above, this friction drive wheel 124 is switched to the driving position by the friction drive wheel position switching means 125, and while the friction drive wheel 124 is made to pressure contact with the friction driving surface 104a of the travelling carrier 101, the friction drive wheel 124 is rotate-driven in the sending-out direction of the travelling carrier 101 by the reducer-equipped motor 145, whereby the travelling carrier 101 entirely supported on the movable rail 106 is set out to the storage rail 118a side connected to the movable rail 106 due to the frictional force between the friction drive wheel 124 and the friction driving surface 104a of the travelling carrier 101, and simultaneously, as described above, the movable body 127 is driven by the friction drive wheel moving means 126 to move this friction drive wheel 124 from the retreating position R to the forwarding position F (see the virtual line of FIG. 10A) integrally with the pair of front and rear guide rollers 137a and 137b. The friction drive wheel 124 of the delivery unit 121B on the opposite side is held at the driving release position.

When the friction drive wheel 124 positioned at the forwarding position F adjacent to the end of the storage rail 118a for the delivering-in operation sends-out the entirety of the travelling carrier 101 from the movable rail 106 to the storage rail 118a, the driving of this friction drive wheel 124 is stopped, and as described above, this friction drive wheel 124 is switched to the driving release position by the friction drive wheel position switching means 125, and this friction drive wheel 124 is retreated from the forwarding position F to the retreating position R by the friction drive wheel moving means 126 as described above, whereby the sending-out transfer of the travelling carrier 101 from the movable rail 106 to the storage rail 118a for the delivering-in operation is completed.

When the storage rail for the delivering-in operation is within the storage area 118B on the opposite side, the travelling carrier 101 supported on the movable rail 106 is sent-out to the storage rail 118b side for the delivering-in operation as described above by using the friction drive wheel 124, the friction drive wheel position switching means 125, and the friction drive wheel moving means 126 of the delivery unit 121B on the side adjacent to the storage rail 118b for this delivering-in operation.

When delivering-out the travelling carrier 101 supported by the storage rail 118a or 118b of the storage area 118A or 118B to the delivering-out main rail 120, the mobile body 107 is made to travel so that the movable rail 106 is connected to the storage rail 118a or 118b on which the travelling carrier 101 to be delivered out is supported, that is, to the storage rail 118a or 118b for the delivering-out operation, and thereafter, the delivery unit 121A or 121B on the side adjacent to the storage rail 118a or 118b for the delivering-out operation is operated as in the drawing-in transfer of the travelling carrier 101 from the delivering-in main rail 119 to the movable rail 106 described above. Then, when the travelling carrier 101 to be delivered out is completely drawn and transferred to the movable rail 106 side, the mobile body 107 is made to travel to a position at which this movable rail 106 is connected to the delivering-out main rail 120, and thereafter, the delivery unit 121B on the side adjacent to the delivering-out main rail 120 is operated in the same manner as in the sending-out transfer of the travelling carrier 101 from the movable rail 106 to the storage rail 118a or 118b for the delivering-in operation as described above.

When the present invention is carried out, and for example, to enable high-speed travelling of the mobile body 7 or 107, it is necessary to increase the space between the end of the movable rail 6 or 106 and the end of the main rail to which said end of the movable rail is connected (in the above-described embodiment, the storage rail 11a, 11b, 118a, or 118b, the delivering-in main rail 14 or 119, the delivering-out main rail 15 or 120, or the like), an auxiliary rail that fills the space between these rails when the movable rail 6 or 106 is connected to the main rail can also be used. On the ends (both ends in the second embodiment, however, in some cases, one end) of the movable rail 6 or 106 on the side for delivering the travelling carrier 1 or 101 and on the travelling carrier delivering side ends of the main rail to which the movable rail 6 or 106 is connected, stopper means that can freely open and close and prevents the travelling carrier 1 or 101 from freely moving and coming off the rail end can be provided. Furthermore, it is also possible that movable rail positioning means for positioning the movable rail 6 or 106 when it is connected to the main rail is provided to prevent horizontal displacement between the movable rail 6 or 106 and the main rail to which the movable rail is connected when transferring the travelling carrier 1 or 101.

Hereinafter, a main part of a third embodiment of the invention in which the auxiliary rail, stopper means that can freely open and close, and movable rail positioning means are incorporated will be described with reference to FIG. 15 through FIG. 20. In FIG. 15 through FIG. 20, as the travelling carrier and the movable rail, for the sake of convenience, the travelling carrier 101 and the movable rail 106 of the second embodiment are shown, and main rails to which this movable rail 106 is connected are shown by the reference numeral 157.

Figure 15:
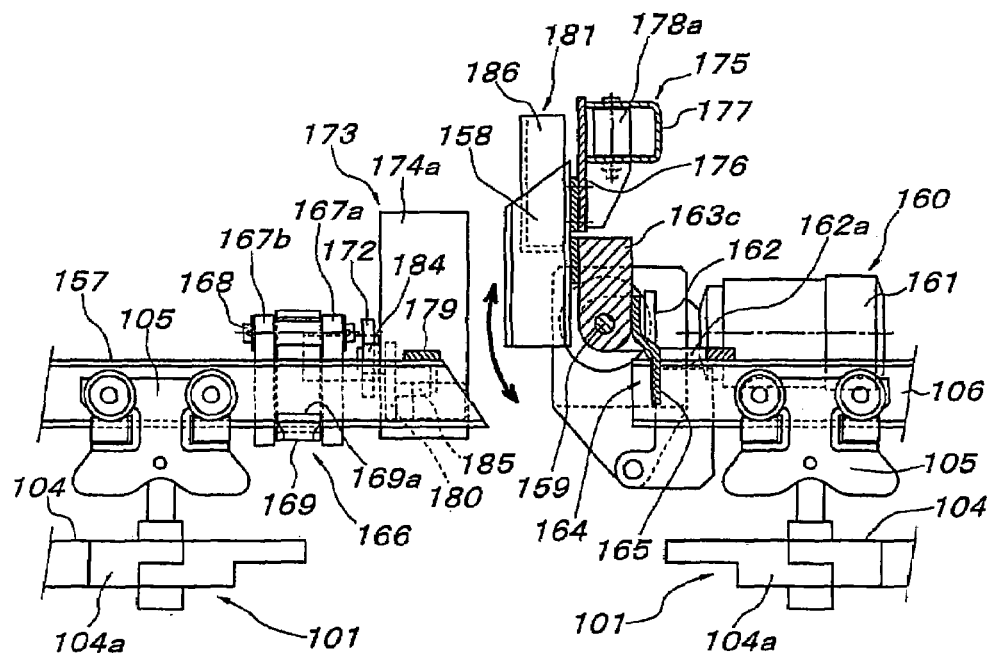
FIG. 15 is a partially longitudinal sectional front view showing a main part of a third embodiment of the invention.
Figure 16:
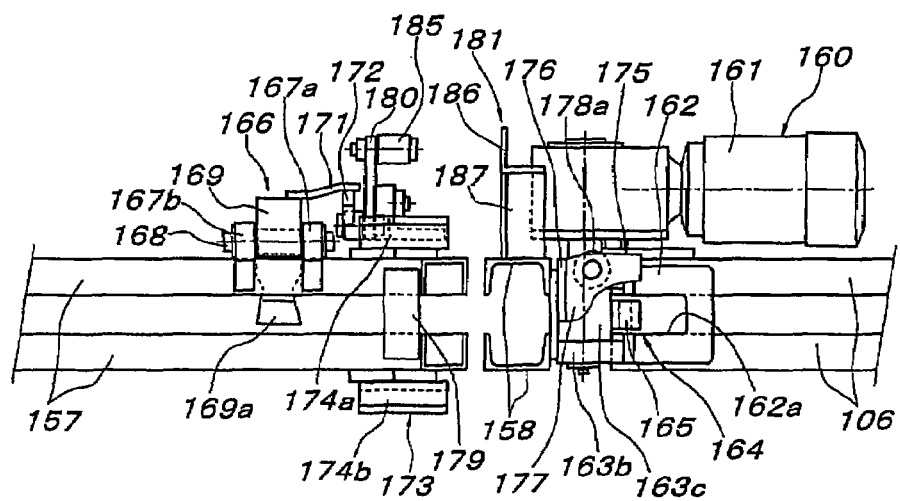
FIG. 16 is a plan view of FIG. 15.
Figure 18:
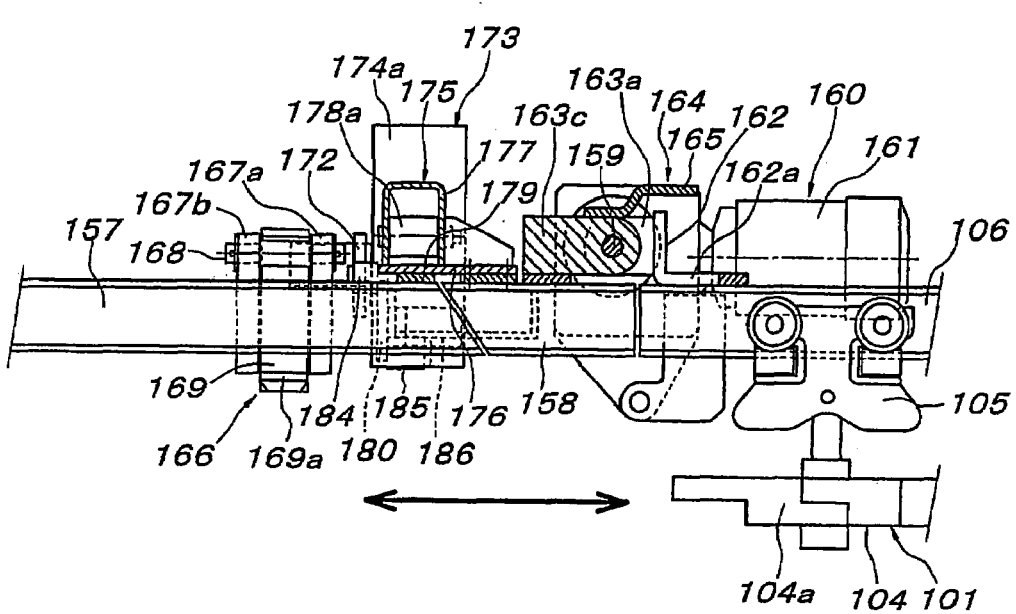
FIG. 18 is a partially longitudinal sectional front view describing a state in that an auxiliary rail shown in FIG. 15
Figure 19:
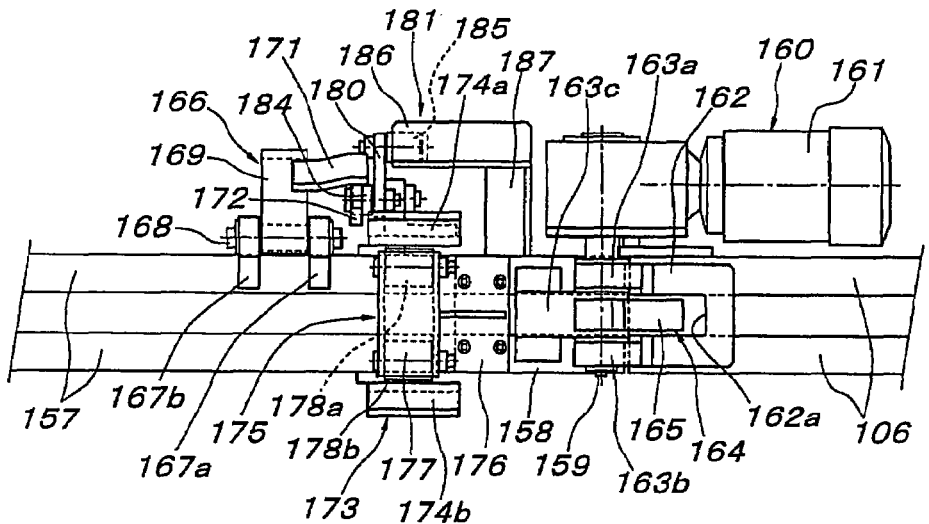
FIG. 19 is a plan view of FIG. 18.

In detail, to the end of the movable rail 106, the auxiliary rail 158 is attached in a manner enabling it to swing vertically by a horizontal support shaft 159, and as drive means 160 that switches this auxiliary rail 158 between a standing open posture shown in FIG. 15 and FIG. 16 and a use posture in which the auxiliary rail is connected to the main rail 157 shown in FIG. 18 and FIG. 19, a reducer-equipped motor 161 that swings the auxiliary rail 158 vertically via the horizontal support shaft 159 is provided. The horizontal support shaft 159 is supported on a pair of left and right bearings 163a and 163b fixed to the upper side of the movable rail 106 via an L-shaped attaching plate 162, and fixed to a bearing 163c positioned between the bearings 163a and 163b and fixed to the upper side of the auxiliary rail 158. The tip end of this auxiliary rail 158 is diagonally cut so that the upper side projects, and the tip end of the main rail 157 to be connected to this auxiliary rail 158 is diagonally cut so that the lower side projects so as to match with the diagonal tip end of the auxiliary rail 158.

The stopper means 164 on the movable rail 106 side is formed by a stopper 165 fixed to the bearing 163c on the auxiliary rail 158 side. This stopper 165 is suspended into the movable rail 106 through a notch 162a formed in an L-shaped attaching plate 162 on the movable rail 106 side when the auxiliary rail 158 is in the standing open posture as shown in FIG. 15 and FIG. 16, can receive the trolley 105 of the travelling carrier 101 travelling in the movable rail 106. As the movable rail 106, the main rail 157, and the auxiliary rail 158, various structures can be used according to the type of the trolley 105 of the travelling carrier 101, and in this embodiment, they are formed by a pair of left and right opposite groove-shaped rail materials, and the stopper 165 moves up and down between the pair of left and right opposite groove-shaped rail materials.

Figure 17:
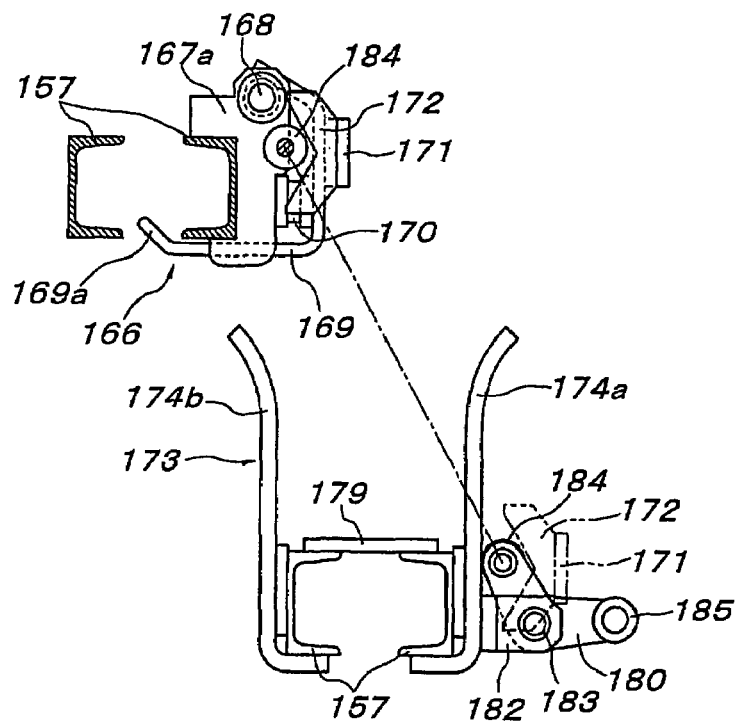
FIG. 17 is a partially longitudinal sectional developed front view showing main rail side stopper means shown in FIG. 15 and FIG. 16 and a portion relating thereto.

The stopper means 166 on the main rail 157 side is formed by an L-shaped stopper 169 whose upper end is pivotally supported so as to freely swing to the left and right by a horizontal forward and rearward horizontal support shaft 168 between a pair of bearing members 167a and 167b attached to one side of the main rail 157, and as shown in FIG. 15 through FIG. 17, when the horizontal plate portion tip end 169a is in an acting posture entering the movement path of the trolley 105 of the travelling carrier 101 from the lower side of the main rail 157, the vertical plate portion 169b comes into contact with a receiving member 170 laid between the pair of bearing members 167a and 167b, and furthermore, to the vertical plate portion 169b, a passive member 172 is continuously provided via a supporting plate 171 extending to the travelling path side of the mobile body 7 or 107. Thus, the L-shaped stopper 169 is held in the acting posture in which it is in contact with the receiving member 170 by gravity acting on the entirety including the supporting plate 171 and the passive member 172, and a spring that urges to this acting posture side can also be used.

The reference numeral 173 denotes movable rail positioning means for positioning the movable rail 106 to a position at which it is connected to the main rail 157 via the auxiliary rail 158, and comprises a pair of left and right guide plates 174a and 174b that are provided on both left and right sides of the end of the main rail 157, stand upward, and have upper ends opened outward to the left and right sides, and a fitting member 175 provided on a tip end upper portion of the auxiliary rail 158. The fitting member 175 is composed of a bearing plate 177 having a gate-shaped side surface attached to the tip end upper side of the substrate 176 that is attached to the tip end upper portion of the auxiliary rail 158 and extends forward, and a pair of left and right guide rollers 178a and 178b which are pivotally supported by a forward and rearward support shaft on the inner side of this gate-shaped bearing plate 177 and whose roller peripheral surfaces project to both left and right sides from the gate-shaped bearing plate 177, and when the auxiliary rail 158 rotates and tilts to the use posture in which it is connected to the main rail 157 shown in FIG. 18 and FIG. 19, the gate-shaped bearing plate 177 fits into between the pair of left and right guide plates 174a and 174b on the main rail 157 side, and at this time, the pair of left and right guide rollers 178a and 178b comes into contact with the inner side surfaces of the guide plates 174a and 174b and rotate, and when the auxiliary rail 158 reaches a use posture connecting the movable rail 106 and the main rail 157 in a line, the tip end of the substrate 176 on the auxiliary rail 158 side is received on the receiving plate 179 provided on the main rail 157 between the pair of left and right guide plates 174a and 174b.

Figure 20:
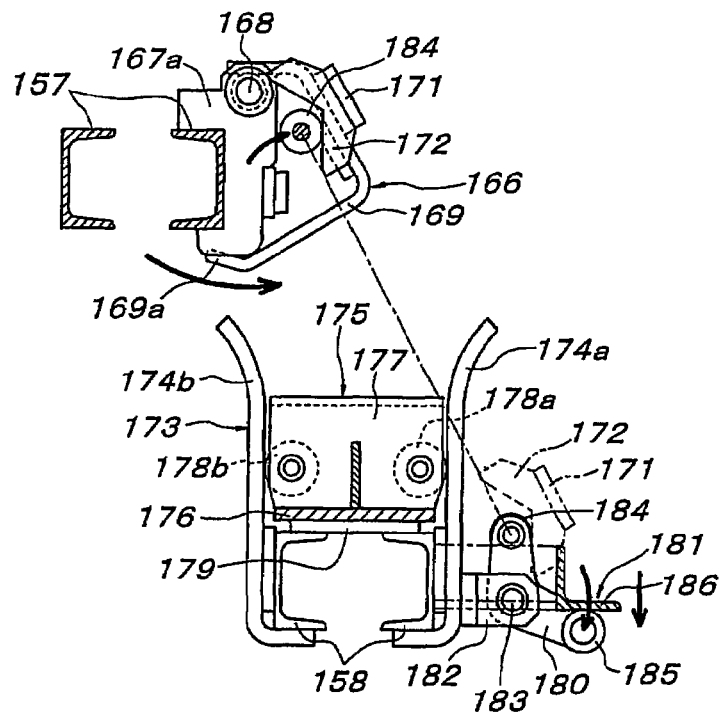
FIG. 20 is a partially longitudinal sectional developed front view showing the main rail side stopper means shown in FIG. 18 and FIG. 19 and a portion relating thereto.

On the auxiliary rail 158, operating means 181 is provided which switches the L-shaped stopper 169 of the stopper means 166 on the main rail 157 side to the non-acting posture shown in FIG. 20 via the passive member 172 continuously provided from this L-shaped stopper 169 and an L-shaped relay lever 180 provided on one side of the tip end of the main rail 157 when this auxiliary rail 158 is switched to a use posture. The L-shaped relay lever 180 has an intermediate bending portion pivotally supported on a bearing 182 fixed to the outer side surface of the lower end of the guide plate 174a on the side where the L-shaped stopper 169 of the guide plates 174a and 174b by a forward and rearward horizontal support shaft 183, and on the tip end of the upward lever portion, a power transmission roller 184 positioned on the inner side of the passive member 172 provided continuously from the L-shaped stopper 169 is pivotally supported by the forward and rearward horizontal support shaft, and on the tip end of the sideway lever portion, a passive roller 185 is pivotally supported by a forward and rearward horizontal support shaft. The operating means 181 is formed by an operation member 186 attached to the auxiliary rail 158 so as to press down the passive roller 185 of the L-shaped relay lever 180 when the auxiliary rail 158 is switched into the use posture. The reference numeral 187 denotes a supporting material that attaches the operation member 186 to the side surface of the auxiliary rail 158.

With the above-described constitution, when the movable rail 106 and the main rail 157 are not connected, the auxiliary rail 158 is switched into a standing open posture shown in FIG. 15 and FIG. 16 via the horizontal support shaft 159 by the reducer-equipped motor 161 of the drive means 160, whereby a sufficient space is secured between the movable rail 106 and the main rail 157, and high-speed travelling of the mobile body 7 or 107 involving slight horizontal oscillation can be realized without a problem. In addition, the auxiliary rail 158 has been switched into the standing open posture, so that the stopper 165 of the movable rail side stopper means 164 is automatically switched into the acting posture entering the inner side of the end of the movable rail 106, and therefore, even when the travelling carrier 101 drawn and transferred to the movable rail 106 side is present, the trolley 105 of the travelling carrier 101 is received by the stopper 165 in the acting posture, whereby an accident of coming off of the travelling carrier 101 from the movable rail 106 can be prevented. On the other hand, the L-shaped stopper 169 of the stopper means 166 on the main rail 157 side is held in the acting posture by gravity, and for example, even when the travelling carrier 101 is stored on this main rail 157 side, the trolley 105 (in detail, vertical axis roller for preventing oscillation to move between the pair of left and right groove-shaped rail materials) of the travelling carrier 101 is received by the horizontal plate portion tip end 169a of the L-shaped stopper 165 in the acting posture, whereby an accident of coming off of the travelling carrier 101 from the main rail 157 can be prevented.

When the movable rail 106 stops at a position at which it is connected to the target main rail 157 according to travelling of the mobile body 7 or 107, the auxiliary rail 158 is switched to the use posture shown in FIG. 18 and FIG. 19 via the horizontal support shaft 159 by the reducer-equipped motor 161 of the drive means 160. According to the rotating and tilting movement of the auxiliary rail 158 at this time, the stopper 165 of the movable rail side stopper means 164 is automatically switched to the non-acting posture separating upward from the inside of the movable rail 106, and simultaneously, the operation member 186 of the operating means 181 that rotates downward integrally with the auxiliary rail 158 presses down the passive roller 185 of the L-shaped relay lever 180 on the main rail 157 side as shown in FIG. 20, so that the L-shaped relay lever 180 rotates and the power transmission roller 184 rotates the L-shaped stopper 169 of the main rail side stopper means 169 horizontally outward against gravity via the passive member 172 and the supporting plate 171 to switch the L-shaped stopper 169 to the non-acting posture. Furthermore, when the auxiliary rail 158 rotates and tilts to the horizontal posture and is switched to the use posture, the fitting member 175 on the auxiliary rail 158 side of the movable rail positioning means 173 fits into between the pair of left and right guide plates 174a and 174b on the main rail 157 side and prevents the movable rail 106 from displacing to the left and right horizontally together with the auxiliary rail 158 with respect to the main rail 157.

Namely, the space between the movable rail 106 and the main rail 157 is filled by the auxiliary rail 158, and the stopper 165 of the movable rail side stopper means 164 and the L-shaped stopper 169 of the main rail side stopper means 166 are automatically switched to the non-acting postures, and furthermore, the movable rail 106 is positioned in the left and right horizontal direction also with respect to the main rail 157 by the movable rail positioning means 175, whereby the travelling carrier 101 can be safely transferred between the movable rail 106 and the main rail 157 via the auxiliary rail 158.

When the travelling carrier delivery end between the movable rail and the main rail 157 is only one end of the movable rail 106, of course, the delivery unit is disposed on only the travelling carrier delivery end side of the movable rail 106, however, even when both ends of the movable rail 106 become travelling carrier delivery ends between the same and the main rail, as in the fourth embodiment whose outline constitution is shown in FIG. 21, the one friction drive wheel 124 is formed so as to reciprocate between one retreating position R at which the friction drive wheel comes into contact with the central position of the entire length of the friction driving surface 104a of the travelling carrier 101 supported on the movable rail 106 and a first forwarding position F1 at which the friction drive wheel comes into contact with a position near the movable rail side end of the friction driving surface 104a of the travelling carrier 101 supported on the main rail 157A to be connected to one end of the movable rail 106, and reciprocate between a second forwarding position F2 at which the friction drive wheel comes into contact with the position near the movable rail side end of the friction driving surface 104a of the travelling carrier 101 supported on the main rail 157B to be connected to the other end of the movable rail 106 and the one retreating position R, whereby the one friction drive wheel 124 can also be used for the transfer of the travelling carrier 101 between the main rails 157A and 157B which connect the one friction drive wheel 124 to any of the both ends of the movable rail 106.

In FIG. 21, a fixed guide rail 188 with a length almost equal to the entire length of the movable rail 106 and a movable guide rail 189 that is supported on the fixed guide rail 188 movably in the length direction of the movable rail and has a length almost equal to the entire length of this fixed guide rail 188 are used, and at almost the central position in the length direction of the movable guide rail 189, the friction drive wheel 124 is provided, however, it is also possible that the movable guide rail 189 is provided on two or more stages to shorten the length of each guide rail. To reciprocate the friction drive wheel 124 between the retreating position R and the first forwarding position F1 or between the retreating position R and the second forwarding position F2, as drive means for reciprocating the movable guide rail 189 with respect to the fixed guide rail 188, in addition to the rack-pinion type, running fork drive means known as load transfer means in various cargo handling machineries such as a type using wire ropes and chains can also be applied. Of course, the friction drive wheel position switching means 125 shown in the second embodiment can be simultaneously used as appropriate, however, this friction drive wheel position switching means 125 is not shown in FIG. 21.

In the embodiments described above, the movable rail 6 that can be moved both horizontally and vertically by the mobile body 7 and the movable rail 106 that can be moved only horizontally by the mobile body 107 are illustrated, however, in the invention, it is also possible that the movable rail that transfers the travelling carrier between the same and the main rail may be allowed to move only vertically. In addition, the movable rail can be a movable rail for reversing the front and rear direction of a travelling carrier in the middle of the travelling path of this travelling carrier (see FIG. 6), or a movable rail that rotates within a predetermined angle range for switching the travelling path. Of course, as the movable rail, a structure that fits with the structure of the main rail to which the movable rail is connected and fits with the supporting structure of the travelling carrier to be guided by these rails can also be used. The constitution of the means for moving the movable rail is not limited to those of the embodiments described above.

The travelling carrier delivery equipment according to the invention can be used in a conveyor line that handles large-sized articles (half-completed goods and completed goods) as means for storing the articles, switching the carrying path, and reversing the front and rear direction when carrying the articles.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. Travelling carrier delivery equipment comprising a main rail, a movable rail which can be connected to the main rail by moving, and a delivery unit for transferring a travelling carrier between the movable rail and the main rail, wherein a friction driving surface parallel to the moving direction of the travelling carrier is provided across the entire length of the travelling carrier, the delivery unit has a friction drive wheel and friction drive wheel moving means, and the friction drive wheel is provided on the movable rail and is switchable between a driving state in that the friction drive wheel propels the travelling carrier via the friction driving surface and a driving release state, and the friction drive wheel moving means reciprocates the friction drive wheel between a retreating position at which the friction drive wheel can be made to contact with the friction driving surface of the travelling carrier supported on the movable rail and a forwarding position at which the friction drive wheel can be made to contact with the friction driving surface of the travelling carrier supported on the main rail.

2. The travelling carrier delivery equipment according to claim 1, wherein the driving release state of the friction drive wheel is realized not by forcibly separating this friction drive wheel from the friction driving surface of the travelling carrier but by switching into a freely-rotatable state.

3. The travelling carrier delivery equipment according to claim 1, wherein the delivery unit has friction drive wheel position switching means that switches the position of the friction drive wheel between a driving position at which the friction drive wheel is made to pressure contact with the friction driving surface and a driving release position at which the friction drive wheel is separated from the friction driving surface, and the driving release state of the friction drive wheel is realized by switching the position of the friction drive wheel to the driving release position.

4. The travelling carrier delivery equipment according to claim 3, wherein the friction drive wheel moving means comprises a movable body that is movable parallel to the movable rail and drive means for reciprocating this movable body, and the friction drive wheel position switching means comprises a friction drive wheel supporting member which is supported on the movable body movably in directions to approach and move away from the friction driving surface of the travelling carrier and on which the friction drive wheel is supported, a drive member which is supported on the movable body movably in directions to approach and move away from the friction driving surface of the travelling carrier, a joint which joins this drive member and the friction drive wheel supporting member movably in a predetermined range in the approaching and moving away directions, a spring which urges the friction drive wheel supporting member in a direction to approach the friction driving surface of the travelling carrier with respect to the drive member, and drive means for reciprocating the drive member.

5. The travelling carrier delivery equipment according to claim 1, wherein the drive means of the friction drive wheel moving means comprises a rack gear provided parallel to the moving direction on the movable body, a pinion gear that engages with this rack gear, and a motor that rotate-drives this pinion gear forward and reverse.

6. The travelling carrier delivery equipment according to claim 1, wherein on both front and rear sides of the moving direction of the friction drive wheel, a pair of guide rollers that come into contact with the friction driving surface of the travelling carrier are provided, and the pair of guide rollers move integrally with the friction drive wheel that is moved to reciprocate by the friction drive wheel moving means.

7. The travelling carrier delivery equipment according to claim 1, wherein the friction drive wheel is supported movably in directions to approach and move away from the friction driving surface of the travelling carrier and urged to the friction driving surface side of the travelling carrier by a spring, and provided with a backup roller that sandwiches the travelling carrier between the same and the friction drive wheel.

8. The travelling carrier delivery equipment according to claim 7, wherein the backup roller is provided on both front and rear sides of the friction drive wheel in a direction in that the friction drive wheel moving means reciprocates the friction drive wheel.

9. The travelling carrier delivery equipment according to claim 7, wherein as the backup rollers, a backup roller the position of which is fixed on the movable rail side at a position corresponding to the friction drive wheel at a retreating position and a backup roller the position of which is fixed on the main rail side at a position corresponding to the friction drive wheel at the forwarding position are provided.

10. The travelling carrier delivery equipment according to claim 7, wherein the backup roller is formed so as to be reciprocated integrally with the friction drive wheel by the friction drive wheel moving means.

11. The travelling carrier delivery equipment according to claim 10, wherein a travelling carrier has a load bar that is hung down on the movable rail via trolleys and parallel to the moving direction, one side surface of this load bar is formed into the friction driving surface, and the friction drive wheel moving means includes a gate-shaped frame covering on the movable rail from above and a reciprocate driving actuator that is set on the movable rail and reciprocates the gate-shaped frame, and the friction drive wheel and the backup roller are attached to vertical support columns on both sides of the gate-shaped frame.

12. The travelling carrier delivery equipment according to claim 1, wherein the movable rail has a length equal to or close to an entire length of the travelling carrier, and the retreating position and the forwarding position of the friction drive wheel are set near the connecting ends of the movable rail and the main rails.

13. The travelling carrier delivery equipment according to claim 1, wherein the movable rail is formed movably in a direction orthogonal to its length direction, and the main rail is provided on both sides of the moving path of the movable rail, and the delivery unit is provided on both ends of the movable rail.

14. The travelling carrier delivery equipment according to claim 1, wherein the movable rail has a length equal to or close to an entire length of the travelling carrier, and formed movably in a direction orthogonal to its length direction, and the main rail is provided on both sides of the moving path of the movable rail, and as the retreating position of the friction drive wheel, one point at which the friction drive wheel can be made to contact with almost the central position of an entire length of the friction driving surface of the travelling carrier supported by the movable rail is set, and as the forwarding position of the friction drive wheel, two points of a point at which the friction drive wheel can be made to contact with the friction driving surface of the travelling carrier supported by one main rail to which one end of the movable rail is connected, and a point at which the friction drive wheel can be made to contact with the friction driving surface of the travelling carrier supported on the other main rail to which the other end of the movable rail is connected, are set.

15. The travelling carrier delivery equipment according to claim 1, wherein an auxiliary rail that can freely open and close and fills a space between a movable rail and a main rail to which the movable rail is connected is provided on the end of the movable rail.

16. The travelling carrier delivery equipment according to claim 15, wherein the auxiliary rail is pivotally supported on an end of the movable rail so as to swing vertically, and drive means that switches this auxiliary rail between a standing open posture and a use posture in which the auxiliary rail is connected to a main rail is provided, and on this auxiliary rail and the main rail, vertical fitting portions that fit with each other when the auxiliary rail is switched to the use posture in which it is connected to the main rail and prevents leftward and rightward horizontal displacements of these rails are provided.

17. The travelling carrier delivery equipment according to claim 15, wherein on a travelling carrier delivery side end of the movable rail, a stopper that freely opens and closes and stops the movement of the travelling carrier to the auxiliary rail side is provided, and this stopper and the auxiliary rail are interlocked with each other so that when the auxiliary rail is in a standing open posture, the stopper takes an acting posture in which the stopper restrains the travelling carrier, and when the auxiliary rail is in a use posture, the stopper takes an non-acting posture in which it allows the travelling carrier to travel to the auxiliary rail side.

18. The travelling carrier delivery equipment according to claim 15, wherein on a travelling carrier delivery side end of the main rail, a stopper that freely opens and closes and stops the movement of the travelling carrier to the movable rail side is provided, and on the auxiliary rail side, means for operating the stopper is provided, and when the auxiliary rail is switched from the standing open posture to the use posture, the operating means switches the stopper from an acting posture to a non-acting posture, and when the auxiliary rail is switched from the use posture to the standing open posture, the stopper is switched from the non-acting posture to the acting posture.

* * * * *